(12) United States Patent
Cui et al.

(10) Patent No.: US 12,160,813 B2
(45) Date of Patent: Dec. 3, 2024

(54) CELL GLOBAL IDENTIFIER READING ENHANCEMENT

(71) Applicant: Apple Inc., Cupertino, CA (US)

(72) Inventors: Jie Cui, San Jose, CA (US); Qiming Li, Beijing (CN); Dawei Zhang, Saratoga, CA (US); Hong He, San Jose, CA (US); Huaning Niu, San Jose, CA (US); Manasa Raghavan, Sunnyvale, CA (US); Xiang Chen, Campbell, CA (US); Yang Tang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 512 days.

(21) Appl. No.: 17/442,076

(22) PCT Filed: May 4, 2021

(86) PCT No.: PCT/CN2021/091811
§ 371 (c)(1),
(2) Date: Sep. 22, 2021

(87) PCT Pub. No.: WO2022/232966
PCT Pub. Date: Nov. 10, 2022

(65) Prior Publication Data
US 2023/0269654 A1 Aug. 24, 2023

(51) Int. Cl.
H04W 48/16 (2009.01)
(52) U.S. Cl.
CPC .................................. H04W 48/16 (2013.01)
(58) Field of Classification Search
CPC .............................. H04W 48/16; H04W 24/10
See application file for complete search history.

(56) References Cited

U.S. PATENT DOCUMENTS

| 2019/0349797 | A1* | 11/2019 | Lin | H04W 24/10 |
|---|---|---|---|---|
| 2020/0359282 | A1 | 11/2020 | Da Silva et al. | |
| 2020/0413460 | A1* | 12/2020 | Tang | H04W 36/0061 |
| 2021/0029768 | A1* | 1/2021 | Shih | H04W 72/23 |
| 2021/0282197 | A1* | 9/2021 | Tang | H04W 48/16 |
| 2023/0284145 | A1* | 9/2023 | Da Silva | H04W 52/0235 370/311 |

FOREIGN PATENT DOCUMENTS

| CN | 111434152 | 7/2020 |
|---|---|---|
| WO | 2020130930 | 6/2020 |

OTHER PUBLICATIONS

3GPP Meeting Report for TSG RAN WG4 Meeting, 95-e 3GPP TSG-RAN4 WG4 Meeting# 96-e, R4-2009501, Aug. 28, 2020, 1010 pages.
International Patent Application No. PCT/CN2021/091811, International Search Report and the Written Opinion, Mailed on Jan. 25, 2022, 9 pages.
3rd Generation Partnership Project; Technical Specification Group Radio Access Network; NR; Requirements for support of radio resource management (Release 17), 3GPP TS 38.133 V17.1.0, Mar. 2021, 2172 pages.
3rd Generation Partnership Project; Technical Specification Group Radio Access Network; NR; Radio Resource Control (RRC) protocol specification (Release 16), 3GPP TS 38.331 V16.4.1, Mar. 2021, 949 pages.

* cited by examiner

Primary Examiner — Barry W Taylor
(74) Attorney, Agent, or Firm — Kilpatrick Townsend & Stockton LLP

(57) ABSTRACT

The present application relates to devices and components including apparatus, systems, and methods to determine a procedure period for a cell global identifier (CGI) reading procedure.

18 Claims, 11 Drawing Sheets

CELL GLOBAL IDENTIFIER READING ENHANCEMENT

CROSS-REFERENCE TO RELATED APPLICATIONS

This application is a 371 United States National Phase of PCT International Patent Application No. PCT/CN2021/091811, filed on May 4, 2021; the disclosure of which is incorporated by reference herein in its entirety for all purposes.

BACKGROUND

Third Generation Partnership Project (3GPP) networks provide that the network may request information from UE regarding cells from which the UE may detect transmissions. The network may request the information for multiple different reasons, such as for the UE establishing and/or transferring connections between cells. The number of cells within the networks have become massive with the expansion and improvements in network technology. Identifiers have been assigned to the different cells such that the network and the UE can identify the different cells.

DETAILED DESCRIPTION

Figure 1:
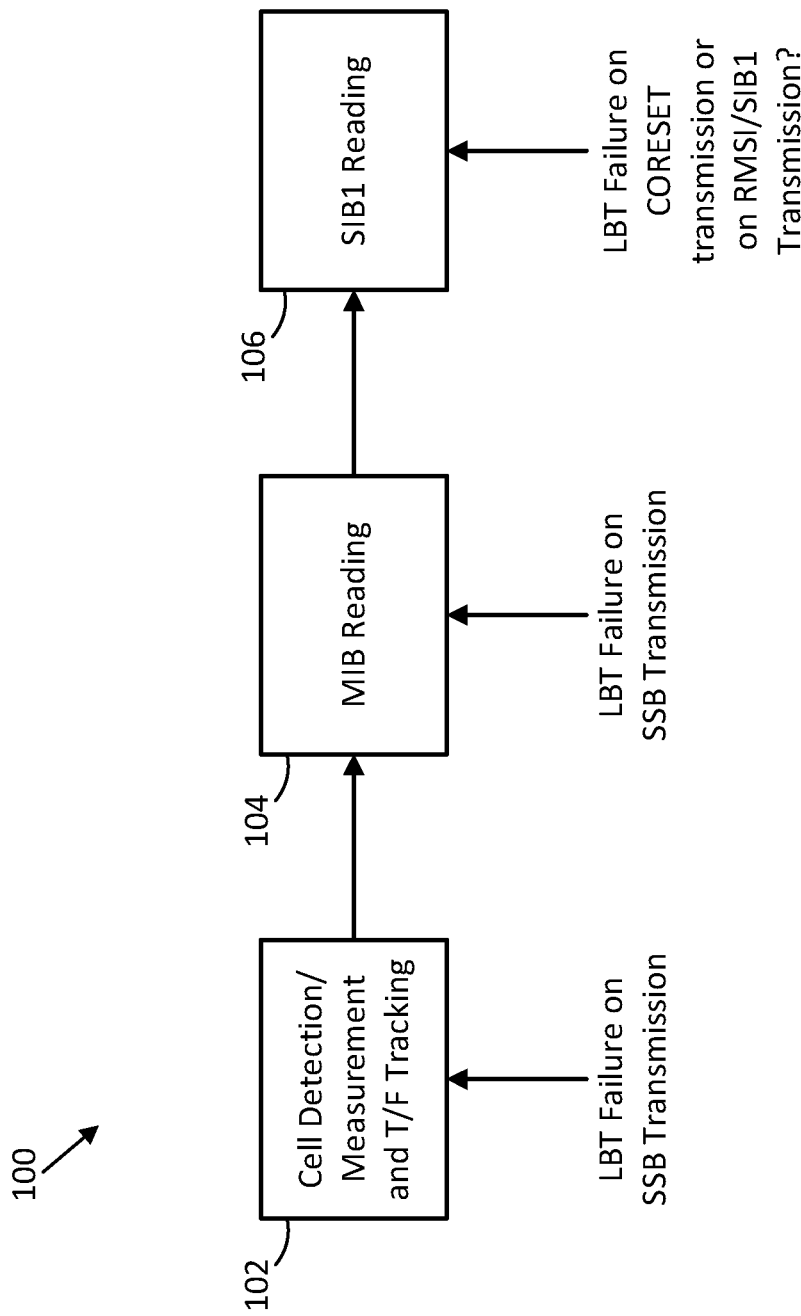
FIG. 1 illustrates an example CGI reading procedure according to some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

The following is a glossary of terms that may be used in this disclosure.

The term "circuitry" as used herein refers to, is part of, or includes hardware components such as an electronic circuit, a logic circuit, a processor (shared, dedicated, or group) or memory (shared, dedicated, or group), an application specific integrated circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "computer system" as used herein refers to any type interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to compute, storage, or network resources provided by physical hardware element(s). A "virtualized resource" may refer to compute, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radio-frequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refers to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, virtualized network function, or the like.

The term "information element" refers to a structural element containing one or more fields. The term "field" refers to individual contents of an information element, or a data element that contains content. An information element may include one or more additional information elements.

Radio access network group 4 (RAN4) introduced the requirements for cell global identifier (CGI) reading for new radio (NR) neighbor cell in third generation partnership project release 16 (Rel-16) and RAN4 also introduced new radio unlicensed spectrum (NR-U) radio resource management (RRM) requirement in Rel-16, however, RAN4 did not consider any requirement or user equipment (UE) behavior when CGI reading is performed on a NR-U cell.

In radio access network group 1 (RAN1) and radio access network group 2 (RAN2), the capability of CGI reading in NR-U has been defined as:

cgi-Acquisition-r16:
Indicates whether the UE supports acquisition of CGI information from a neighbouring NR unlicensed cell in an unlicensed carrier by reading system information block type 1 (SIB1) of the neighbouring unlicensed cell and reporting the acquired information to the network.

FIG. 1 illustrates an example CGI reading procedure 100 according to some embodiments. In particular, the CGI reading procedure 100 illustrates a procedure that may be performed by a UE to read a CGI of a target cell. The CGI may allow the UE and the network to identify a same node, whereas the UE and the network may have separate identifiers for the same cell separate from the CGI prior to the CGI reading procedure 100. The UE may perform the CGI reading procedure 100, or portions thereof, in response to a trigger for a CGI report.

The procedure 100 may include a cell detection/measurement and timing/frequency (T/F) tracking procedure 102. The cell detection/measurement and T/F tracking procedure 102 may include detecting signals from a cell and performing measurements on signals transmitted by the cell. The signals transmitted by the cell may be broadcast and the UE may detect the broadcasted signals. In some embodiments, the signals may include one or more synchronization signals. The UE may measure the signals to determine one or more measurements related to the cell, such as signal-to-noise ratio for the cell. The measurements of the cell may be utilized for determining which cell the UE is to establish a connection. The UE may further determine a timing and/or frequency for signals from the cell. For example, the UE may determine a timing offset and/or a frequency offset for the cell. The timing and/or frequency determined for the cell may allow the UE to detect additional signals from the cell.

The procedure 100 may further include a master information block (MIB) acquisition stage 104. The UE may read a MIB for a cell in the MIB acquisition stage 104. The MIB may be included in a synchronization signal/physical broadcast channel block (SSB), where the UE may detect the SSB to read the MIB. The UE may utilize the timing and/or the frequency for the cell determined in the procedure 102 to detect the SSB including the MIB. Based on the MIB read during the MIB acquisition stage 104, the UE may determine timing for other signals transmitted by the cell, such as the timing of system information block transmissions by the cell.

The procedure 100 may further include a system information block type 1 (SIB1) acquisition stage 106. The UE may detect one or more system information blocks (SIBs) of the cell (such as the SIB1) during the SIB1 acquisition stage 106. The UE may determine a timing of the SIB1 based on a physical downlink control channel (PDCCH) transmission that schedules the SIB1. The SIB1 may be transmitted within a physical downlink shared channel (PDSCH) transmission, where a timing of the PDSCH transmission may be indicated by the PDCCH transmission. The UE may determine the timing of the PDSCH that carries the SIB1 based on the PDCCH transmission that schedules the SIB1. The UE may determine a CGI for the cell based on the SIB1. For example, the UE may determine a cell identifier for a cell and a public land mobile network (PLMN) identifier for a PLMN from the SIB1. The UE may determine the CGI from the cell identifier and the PLMN.

In the unlicensed spectrum, cells of the network may perform listen before talk (LBT) prior to transmitting signals. In particular, the cells may sense for other transmissions occurring on a communication channel prior to transmitting a signal on the communication channel. For example, the cell may sense an energy level on the communication channel to verify that the channel is available for transmission. In the case where the cell determines that the communication channel is not available based on the LBT (referred to as LBT failure), the cell may not transmit a signal on the communication channel at the time. These LBT failures may cause issues for the CGI reading procedure 100 where the signals for the CGI reading procedure 100 from the cell may not be provided cell. For example, the cell may not provide signals (such as the synchronization signals and/or the MIB) for the cell detection/measurement and T/F tracking procedure 102 and/or the MIB acquisition stage 104 based on an LBT failure occurring on SSB transmission. Further, the cell may not provide the signals (such as the PDCCH transmission scheduling the SIB1, the PDSCH that carriers, and/or the MIB) for the SIB1 acquisition stage 106.

Detailed UE behavior of NR-U CGI reading is not addressed in present networks. The LBT failure may be carefully considered in the CGI reading function, since consistent LBT failures may eventually fail the entire CGI reading procedure. For example, the LBT failures described in relation to FIG. 1 may cause the CGI reading procedure 100 to fail. This situation of LBT failures during the CGI reading procedure 100 is not addressed in present networks.

In legacy third generation partnership project (3GPP) technical specification (TS) 38.133 (3GPP Organizational Partners. (2020-09). 3$^{rd}$ Generation Partnership Project; Technical Specification Group Radio Access Network; NR: Requirements for support of radio resource management (Release 16) (3GPP TS 38.133 V.165.0)), the legacy NR CGI reading requirement is defined as:

9.11.2 CGI identification of an NR cell with autonomous gaps

The UE shall identify and report the CGI of a known NR target cell when requested by the network for the purpose of reportCGI. Only one cell is provided to the UE with cellForWhichToReportCGI for identifying the CGI. The UE may make autonomous gaps in both downlink reception and uplink transmission for receiving master information block (MIB) and SIB1 message according to clause 5.5.3 of TS 38.331 [2]. Note that a UE is not required to use autonomous gap if useAutonomousGaps is set to false. If autonomous gaps are used for measurement with the purpose of reportCGI, regardless of whether discontinuous reception (DRX) is used or not, or whether secondary cell(s) (SCell(s)) are configured or not, the UE shall be able to identify a new CGI of NR cell within:

$$T_{identify\_CGI} = (T_{MIB} + T_{SIB1}) \text{ milliseconds (ms)}$$

Where:

$T_{MIB}$ is the time period used to acquire MIB message. $T_{MIB}=6*T_{SMTC}$ ms for target cell carrier frequency on frequency range 1 (FR1) and $T_{MIB}=1251*T_{SMTC}$ ms for target cell carrier frequency on frequency range 2 (FR2).

$T_{SIB1}$ is the time period used to acquire SIB1 message. $T_{SIB1}=6*T_{SMTC}$ ms.

Where $T_{SMTC}$ is the periodicity of the synchronization signal/physical broadcast channel block measurement time configuration (SMTC) occasions configured for the target cell carrier.

The requirement for identifying the CGI of an NR cell within $T_{identify\_CGI}$ is applicable when no DRX is used as well as when any of the DRX cycles specified in TS 38.331 [2] is used.

Figure 2:
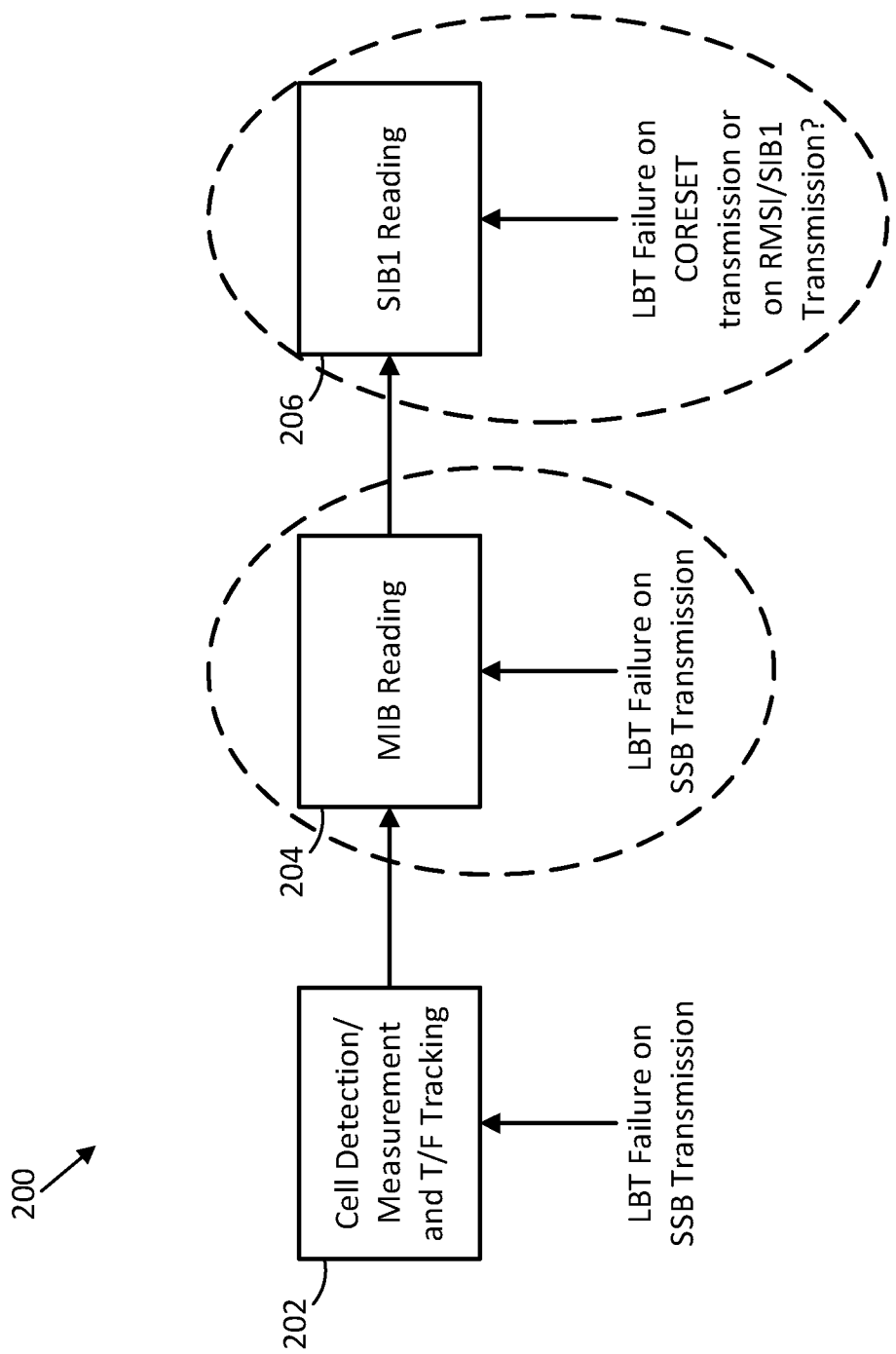
FIG. 2 illustrates a CGI reading procedure in accordance with some embodiments.

The condition of known cell has been defined as below, and that replies on the successfully reception of the downlink (DL) reference signal (RS) and channels, In the requirement a cell is known if,
During the last 5 seconds for FR1 or 3 seconds for FR2 before the reception of the report CGI command:
The UE has sent a valid layer 3-reference signal received power (L3-RSRP) measurement report with SSB index for the target cell and
During MIB decoding at least reported synchronization signal/physical broadcast channel blocks (SSBs) remains detectable according to the cell identification conditions specified in clauses 9.2 or 9.3 of TS 38.133, and
During SIB1 decoding the SSB used for MIB decoding remains detectable according to the cell identification conditions specified in clauses 9.2 or 9.3 of TS 38.133, and
During MIB decoding, the SSB for MIB decoding remains detectable with signal-to-noise ratio (SNR) $\geq[-3]$dB
During SIB1 decoding, the physical downlink shared channel (PDSCH) for SIB1 decoding remains detectable with SNR$\geq[-3]$dB However, this presents problematic cases for MIB reading and SIB1 reading as shown in FIG. 2. In particular, FIG. 2 illustrates a CGI reading procedure 200 in accordance with some embodiments. The CGI reading procedure 200 may include one or more of the features of the CGI reading procedure 100 (FIG. 1). In particular, a cell detection measurement and T/F tracking procedure 202 may include the features of the cell detection/measurement and T/F tracking procedure 102 (FIG. 1), a MIB acquisition stage 204 may include the features of the MIB acquisition stage 104 (FIG. 1), and a SIB1 acquisition stage 206 may include the features of the SIB1 acquisition stage 106 (FIG. 1).

As illustrated by the dashed ovals in FIG. 2, UE behavior for LBT failure in portions of the CGI reading procedure 200 have not been previously defined. In particular, failures in the LBT for signals related to the cell detection/measurement and T/F tracking procedure 202 may be addressed by cell detection with LBT. However, LBT failure for signals related to the MIB acquisition stage 204 and the SIB1 acquisition stage 206 have not been addressed in legacy implementations. Due to operation of the MIB acquisition stage 204 and the SIB1 acquisition stage 206 being undefined for LBT failure, the CGI reading procedure 200 may fail when an LBT failure occurs for signals related to the MIB acquisition stage 204 and/or the SIB1 acquisition stage 206.

Figure 3:
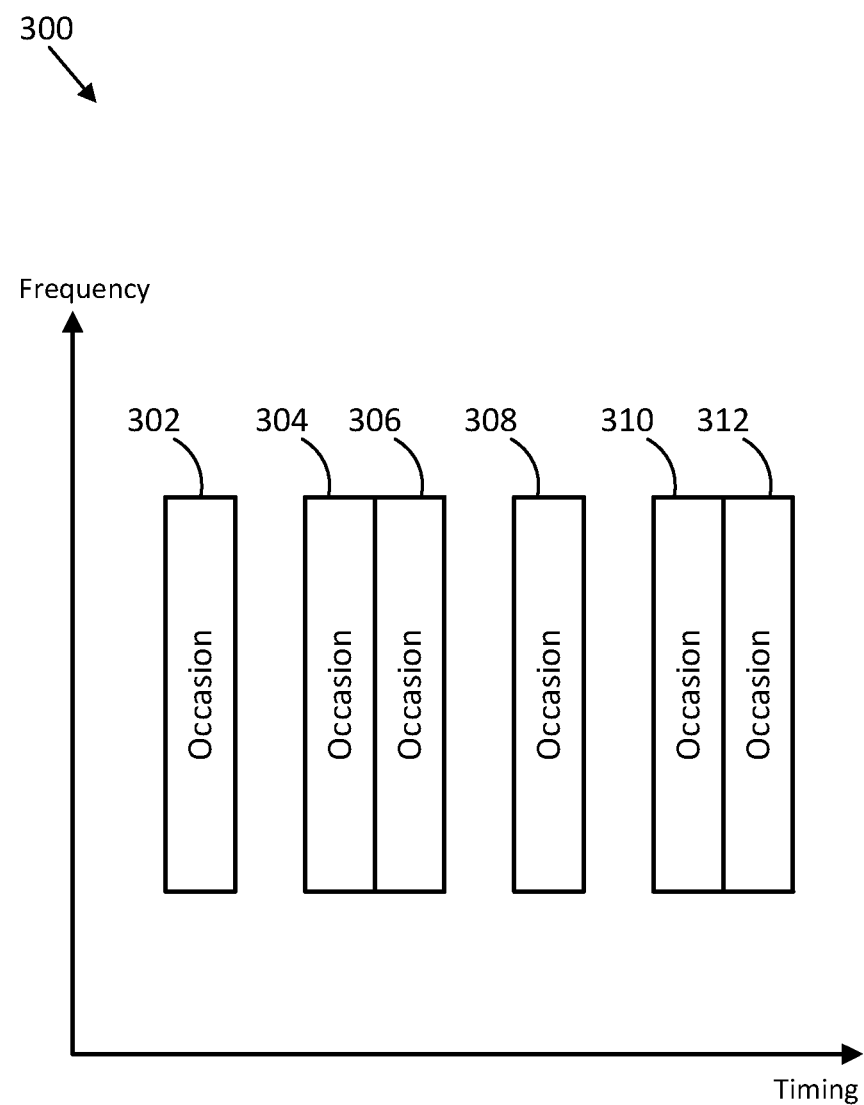
FIG. 3 illustrates an example occasion arrangement in accordance with some embodiments.

FIG. 3 illustrates an example occasion arrangement 300 in accordance with some embodiments. In particular, the occasion arrangement 300 illustrates example occasions where a UE may expect to receive transmissions related to a CGI reading procedure (such as the CGI reading procedure 100 (FIG. 1) and/or the CGI reading procedure 200 (FIG. 2)). Each of the occasions may be scheduled for a particular transmission. For example, a first occasion 302 may be scheduled for a SSB in some embodiments. Further, a second occasion 304 may be scheduled for a PDCCH to be transmitted on resource elements of a control resource set (CORESET) and a third occasion 306 may be scheduled for a PDSCH. The scheduling of the occasions may repeat, where a fourth occasion 308 may be scheduled for a SSB, a fifth occasion 310 may be scheduled for a CORESET transmission (which may also be referred to as a "PDCCH transmission or, simply, "PDCCH"), and a sixth occasion 312 may be scheduled for a PDSCH in some embodiments.

Based on the scheduling, each of the occasions (or some portion of the occasions) may be utilized for transmission of signals utilized in the CGI reading procedure. For example, the SSBs that may be transmitted in the first occasion 302 and/or the fourth occasion 308 may be utilized for a cell detection/measurement and T/F tracking procedure (such as the cell detection/measurement and T/F tracking procedure 102 (FIG. 1) and/or the cell detection/measurement and T/F tracking procedure 202 (FIG. 2)) and/or a MIB acquisition stage (such as the MIB acquisition stage 104 (FIG. 1) and/or the MIB acquisition stage 204 (FIG. 2)). The CORESET transmissions that may be transmitted in the second occasion 304 and/or the fifth occasion 310 may be utilized for the MIB acquisition stage and/or a SIB1 acquisition stage (such as the SIB1 acquisition stage 106 (FIG. 1) and/or the SIB1 acquisition stage 206 (FIG. 2)). The PDSCH that may be transmitted in the third occasion 306 and/or the sixth occasion 312 may be utilized for the SIB1 acquisition stage.

Whether a scheduled signal is transmitted in an occasion may depend on results of an LBT performed by a cell. In particular, the cell may perform LBT operations prior to transmitting within each of the occasions. If LBT passes for each of the occasions, the scheduled transmissions may be transmitted in each of the occasions. For each of the occasions where LBT fails, the scheduled transmission may not be transmitted in the occasion. For example, if an LBT operation for the first occasion 302 results in an LBT failure, the SSB may not be transmitted by the cell in the first occasion 302 and the SSB may not be available at the UE in the first occasion 302. Further, if an LBT operation for the second occasion 304 results in an LBT failure, a CORESET transmission may not be transmitted by the cell in the second occasion 304 and the CORESET transmission may not be available at the UE in the second occasion 304. If an LBT operation for the third occasion 306 results in an LBT failure, the PDSCH may not be transmitted by the cell in the third occasion 306 and the PDSCH may not be available at the UE in the third occasion 306.

A UE performing a CGI reading procedure may count the number of occasions in which a scheduled transmission is not received. For example, the UE may count a number of occasions in which SSBs scheduled have not been received, a number of occasions in which CORESET transmissions scheduled have not been received, a number of occasions in which PDSCH scheduled have not been received or some combination thereof. Having the transmissions not received by the UE may mean that the transmissions are not available at the UE. The UE may utilize the number of occasions in which a scheduled transmission has not been received to determine a procedure period for the CGI reading procedure. While the occasion arrangement 300 shows a particular arrangement of the occasions, it should be understood that the arrangement of occasions may differ in other embodiments.

Figure 4:
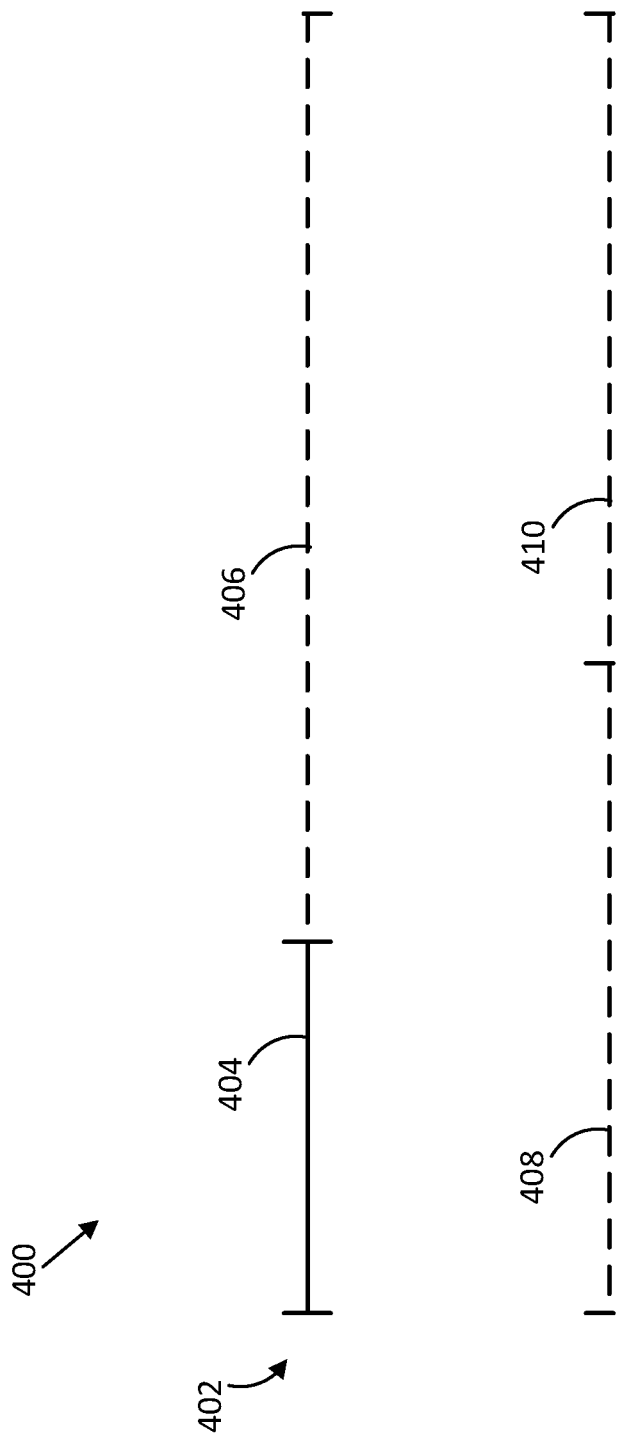
FIG. 4 illustrates example procedure period timing for a CGI reading procedure in accordance with some embodiments.

FIG. 4 illustrates example procedure period timing 400 for a CGI reading procedure in accordance with some embodiments. For example, the procedure period timing 400 illustrates an example procedure period 402 that may be defined for a CGI reading procedure (such as the CGI reading procedure 100 (FIG. 1) and/or the CGI reading procedure 200 (FIG. 2)). Further, the procedure period timing 400 illustrates components of the procedure period 402.

The procedure period timing 400 illustrates an example procedure period 402 that may be defined by the approaches described herein. The procedure period 402 may include a base period 404 and, in some instances, an extension period 406. The base period 404 may be defined and may be a minimal time period for the procedure period 402. The procedure period 402 may be set to the base period 404 when no LBT failures occur during the CGI reading procedure, and, therefore, each of the relevant transmissions (such as the SSB, the CORESET transmission, and/or the PDSCH) scheduled within transmission occasions (such as the occasions illustrated in FIG. 3) is transmitted by a cell for which the CGI reading procedure is applied and available at a UE performing the CGI reading procedure.

A length of the extension period 406 may be variable and the length may be defined based on a number of occasions in which a scheduled transmission has not been transmitted and, therefore, is not available at the UE performing the CGI reading procedure. For example, the extension period 406 may be set to zero if no LBT failures occur during the CGI reading procedure, thereby resulting in the all of the relevant scheduled transmissions being transmitted in the occasions during the CGI reading procedure. If LBT failures occur during the CGI reading procedure, a length of the extension period 406 may be defined based on the number of occasions in which the relevant scheduled transmission are not transmitted by the cell and, therefore, not available at the UE. The extension period being non-zero when LBT failures occur may cause the procedure period 402 to be longer than the base period 404, which can allow a UE performing the CGI reading procedure to compensate for LBT failures. The extension period 406 may be defined by the approaches described further throughout this disclosure.

The procedure period timing 400 further illustrates components that may produce the procedure period 402 in some embodiments. In particular, the procedure period 402 may include a time period 408 for MIB reading and a time period 410 for SIB reading. In particular, the time period 408 for MIB reading may be a time defined for a UE to read an MIB (such as during the MIB acquisition stage 104 (FIG. 1) and/or the MIB acquisition stage 204 (FIG. 2)) during the CGI reading procedure. The time period 410 for SIB reading may be defined for a UE to read an SIB1 (such as during the SIB1 acquisition stage 106 (FIG. 1) and/or the SIB1 acquisition stage 206 (FIG. 2)) during the CGI reading procedure. The time period 408 for MIB reading and/or the time period 410 for SIB reading may be defined as described further throughout this disclosure. In some embodiments, the procedure period 402 may further include a time period for cell detection/measurement and T/F tracking (such as a time period for performance of the cell detection/measurement and T/F tracking procedure 102 (FIG. 1) and/or the cell detection/measurement and T/F tracking procedure 202 (FIG. 2).

In a first approach for CGI reading in NR-U, the procedure period of CGI reading of a target NR-U cell may be implemented at UE as $T_{identify\_CGI\_NR-U} = (T_{MIB\_NR-U} + T_{SIB1\_NR-U})$ ms. For example, a procedure period (such as the procedure period 402 (FIG. 4)) for a CGI reading procedure (such as the CGI reading procedure 100 (FIG. 1) and/or the CGI reading procedure 200 (FIG. 2)) of a target cell may be defined by $T_{identify\_CGI\_NR-U} = (T_{MIB\_NR-U} + T_{SIB1\_NR-U})$ ms. $T_{MIB\_NR-U}$ may be the time period used for MIB reading of a NR-U cell, and $T_{SIB1\_NR-U}$ may be the time period used for SIB1 reading. $T_{MIB\_NR-U}=6*T_{SMTC}+K_{MIB}*T_{SMTC}$. $T_{SMTC}$ may be a periodicity of SMTC occasions. $K_{MIB}$ may be the number of SMTC or SSB occasions not available at the UE during the CGI reading procedure for MIB reading of the target cell. In this instance, the $T_{SIB1\_NR}$-U and $6*T_{SMTC}$ may define a base period (such as the base period 404 (FIG. 4)) for the procedure period and the $K_{MIB}*T_{SMTC}$ may define an extension period (such as the extension period 406 (FIG. 4)) for the procedure period. For example, $K_{MIB}$ may be the number of SMTC or SSB occasions in which the SSB for a corresponding MIB for the MIB reading is not available at the UE during the CGI reading procedure (such as the CGI reading procedure 100 (FIG. 1) and/or the CGI reading procedure 200 (FIG. 2)). That means UE may extend its MIB reading period (such as the time period 408 (FIG. 4) for MIB reading) in the CGI reading if the LBT failure at target cell cause the SMTC or SSB occasions not available at the UE. Accordingly, the UE may determine the procedure period for the CGI reading procedure based on a number of occasions in which SSB is not available at the UE and the SMTC periodicity during the CGI reading procedure in these instances.

In some embodiments, the procedure period for the CGI reading procedure may have a maximum time that the procedure period may be extended due to LBT failure for occasions scheduled for SSBs. $K_{MIB} \leq K_{MIB\_MAX}$. $K_{MIB\_MAX}$ may be the max number of SMTC periodicity UE can extend due to the LBT failure on MIB during the CGI reading procedure. UE may count the LBT failure on the MIB (or SSB that carries MIB) during MIB reading stage of CGI reading to check if the total LBT failure on MIB would exceed the threshold of $K_{MIB\_MAX}$. For example, the UE may determine a number of occasions scheduled for SSB in which the SSB was not transmitted by the cell and, accordingly, not available at the UE. The UE may determine whether the number of occasions exceeds a threshold number of occasions (defined as $K_{MIB}$).

Upon exceeding $K_{MID\_MAX}$ over the period of MIB acquisition stage in CGI reading, one of three options may be applied. In a first option, UE may restart the MIB acquisition stage in CGI reading for the same NR-U target cell, the CGI reading process may not stop. For example, the UE may restart the MIB acquisition stage (such as the MIB acquisition stage 104 (FIG. 1) and/or the MIB acquisition stage 204 (FIG. 2)) based on a determination that the number of occasions scheduled for SSB in which the SSB was not available at the UE exceeds the threshold number of occasions. The UE may continue with the CGI reading procedure with the MIB acquisition stage being restarted.

In a second option, UE may directly drop this CGI reading procedure for this target NR-U cell, and may quit the CGI reading without any error indication back to network or report CGI reading failure to network. For example, the UE may stop the CGI reading procedure based on a determination that the number of occasions scheduled for SSB in which the SSB was not available at the UE exceeds the threshold number of occasions. The UE may not provide an error indication to the network or report a CGI reading failure to the network in these instances.

In a third option, UE may restart the MIB acquisition stage in CGI reading for the same NR-U target cell, but UE may start another counter $K_{MIB\_TOTAL}$, ($K_{MIB} \leq K_{MIB\_MAX} \leq K_{MIB\_TOTAL}$), $K_{MIB\_TOTAL}$ may be the counter for all LBT failures on MIB acquisition during the CGI reading period. Thus, the $K_{MIB\_TOTAL}$ counter may track LBT failures for an entirety of the CGI reading period, while the $K_{MIB}$ counter tracks LBT failures for a specific MIB acquisition phase. If $K_{MIB\_TOTAL}$ reaches a threshold, UE may stop and quit CGI reading procedure, and may quit the CGI reading without any error indication back to network or reports CGI reading failure to network. For example, the UE may restart the MIB acquisition stage based on a determination that the number of occasions scheduled for SSB in which the SSB was not available at the UE exceeds the threshold number of occasions. The UE may reset the count for the LBT failures on the MIB (or SSB that carries the MIB) during the MIB acquisition stage of CGI reading and restart the counting of the LBT failure on the MIB (or the SSB that carries the MIB) during the MIB acquisition stage of CGI reading. The UE may continue to restart the MIB acquisition stage and reset the counter each time that the number of occasions exceeds the threshold number of occasions. Further, the UE may maintain a second counter of the LBT failures on the MIB (or SSB that carries the MIB) during the MIB reading stage of CGI reading, where the second counter may not be reset when the MIB acquisition stage is restarted. The UE may quit the CGI reading procedure based on a determination that the second counter exceeds a second threshold number of occasions, wherein the second threshold number of occasions is greater than the threshold number of occasions of the restart of the MIB acquisition stage. The UE may not provide any error indication back to the network or report CGI reading failure to the network when the UE quits the CGI reading procedure.

In other embodiments of the third option, the UE may restart the MIB acquisition stage based on a determination that the number of occasions scheduled for SSB in which the SSB was not available at the UE exceeds the threshold number of occasions. The UE may further count a number of times that the MIB acquisition stage has been restarted and compare the number of times that the MIB acquisition stage has been restarted with a threshold number of MIB restarts. The UE may quit the CGI reading procedure based on a determination that the number of times that the MIB acquisition stage has been restarted exceeds the threshold number of MIB restarts. The UE may not provide an error indication to the network or report a CGI reading failure to the network in these instances. $K_{MIB}$, $K_{MIB\_MAX}$, and/or $K_{MIB\_TOTAL}$ may be predefined in the specification or configured from network. In particular, $K_{MIB}$, $K_{MIB\_MAX}$, and/or $K_{MIB\_TOTAL}$ described in relation to the options above may be predefined in the specification or configured from the network.

Further to the first approach, the procedure period of CGI reading of a target NR-U cell may be implemented at UE based on $T_{SIB1\_NR-U}=6*T_{SIB1}+K_{SIB1}*T_{SMTC}$. For example, a procedure period (such as the procedure period 402 (FIG. 4)) for a CGI reading procedure (such as the CGI reading procedure 100 (FIG. 1) and/or the CGI reading procedure 200 (FIG. 2)) of a target cell may be defined based on $T_{SIB1\_NR-U}=6*T_{SMTC}+K_{SIB1}*T_{SMTC}$. $K_{SIB1}$ may be the number of SMTC occasions in which physical downlink control channel (PDCCH) (CORESET for SIB1) or remaining minimum system information (RMSI) (PDSCH that carries SIB1) or SSB for corresponding MIB is not available at the UE during the SIB1 acquisition stage for SIB1 reading of the target cell. In this instance, the $T_{MIB\_NR-U}$ and $6*T_{SMTC}$ may define a base period (such as the base period 404 (FIG. 4)) for the procedure period and the $K_{SIB1}*T_{SMTC}$ may define an extension period (such as the extension period 406 (FIG. 4)) for the procedure period. For example, $K_{SIB1}$ may be the number of SMTC or SSB occasions in which the SSB that carries an MIB, the CORESET for an SIB1, and/or a PDSCH that carries an SIB1 for the target cell is not available at the UE during a CGI reading procedure (such as the CGI reading procedure 100 (FIG. 1) and/or the CGI reading procedure (FIG. 2)). That means UE may extend its SIB1 reading period in the CGI reading if the LBT failure at target cell cause any of the following unavailabilities: the SSB occasions that carries MIB of this target cell not available at the UE (LBT failures disable the SSB transmission); the CORESET for the SIB1 (CORESET with index 0 (CORESET0)) of this target cell not available at the UE (LBT failure disables the CORESET0 transmission); the RMSI (PDSCH that carries SIB1) of this target cell not available at the UE (LBT failure disables the RMSI transmission). Accordingly, the UE may determine the procedure period for the CGI reading procedure based on a number of occasions in which a PDCCH that schedules a SIB1 is not available, a PDSCH that carries a SIB1 is not available, and/or a MIB is not available during a SIB1 acquisition stage (such as the SIB1 acquisition stage 106 (FIG. 1) and/or the SIB1 acquisition stage 206 (FIG. 2)) for SIB1 in these instances.

In some embodiments, the procedure period for the CGI reading procedure may have a maximum time that the procedure period may be extended due to LBT failure for SIB1 reading during the CGI reading procedure. $K_{SIB1} \leq K_{SIB1\_MAX}$. $K_{SIB1\_MAX}$ may be the max number of SMTC periodicity UE can extend due to any of the above unavailabilities for SIB1 reading during the CGI reading procedure. UE may count the number of SMTC extensions during SIB1 reading stage of CGI reading to check if the total extension due to LBT failure on SIB1 reading would exceed the threshold of $K_{SIB1\_MAX}$. For example, the UE may count the number of occasions in which a PDCCH that schedules a SIB1 is not available, a PDSCH that carries a SIB1 is not available, and/or a MIB is not available during the SIB1 acquisition stage. Upon exceeding $K_{SIB1\_MAX}$ over the period of SIB1 acquisition stage in CGI reading one of five options may be applied.

In a first option, UE may restart the SIB1 acquisition stage in CGI reading for the same NR-U target cell, the CGI reading process may not stop. For example, the UE may restart the SIB acquisition stage (such as the SIB1 acquisition stage 106 (FIG. 1) and/or the SIB1 acquisition stage 206 (FIG. 2)) based on a determination that the number of occasions in which a PDCCH that schedules a SIB1 is not available, a PDSCH that carries a SIB1 is not available, and/or a MIB is not available during the SIB1 acquisition stage exceeds a threshold number of occasions. The UE may continue with the CGI reading procedure with the SIB1 acquisition stage being restarted.

In a second option, UE may restart the MIB acquisition stage in CGI reading for the same NR-U target cell, the CGI reading process may not stop. For example, the UE may restart the MIB acquisition stage (such as the MIB acquisition stage 104 (FIG. 1) and/or the MIB acquisition stage 204 (FIG. 2)) based on a determination that the number of occasions in which a PDCCH that schedules a SIB1 is not available, a PDSCH that carries a SIB1 is not available, and/or a MIB is not available during the SIB1 acquisition stage exceeds a threshold number of occasions. The UE may continue with the CGI reading procedure with the MIB acquisition stage being restarted.

In a third option. UE may directly drop this CGI reading procedure for this target NR-U cell, and may quit the CGI reading without any error indication back to network or report CGI reading failure to network. For example, the UE may stop the CGI reading procedure based on a determination that the number of occasions in which a PDCCH that schedules a SIB1 is not available, a PDSCH that carries a SIB1 is not available, and/or a MIB is not available during the SIB1 acquisition stage exceeds a threshold number of occasions. The UE may not provide an error indication to the network or report a CGI reading failure to the network in these instances.

In a fourth option, UE may restart the MIB acquisition stage in CGI reading for the same NR-U target cell, but UE may start another counter $K_{TOTAL}$, $(K_{MIB\_MAX}+K_{SIB1\_MAX} \leq K_{TOTAL})$, $K_{TOTAL}$ may be the counter for all LBT failures on both MIB and SIB1 acquisition during the CGI reading period. Thus, the $K_{TOTAL}$ counter may track LBT failures for an entirety of the CGI reading period, while the $K_{SIB1}$ counter tracks LBT failures for a specific SIB1 acquisition phase. If $K_{TOTAL}$ reaches a threshold, UE may stop and quit CGI reading procedure, and may quit the CGI reading without any error indication back to network or reports CGI reading failure to network. For example, the UE may restart the MIB acquisition stage (such as the MIB acquisition stage 104 (FIG. 1) and/or the MIB acquisition stage 204 (FIG. 2)) based on a determination that the number of occasions in which a PDCCH that schedules a SIB1 is not available, a PDSCH that carries a SIB1 is not available, and/or a MIB is not available during the SIB1 acquisition stage exceeds a threshold number of occasions. The UE may reset the count for the LBT failures on both MIB and SIB1 acquisition and restart the counting for the LBT failures on both MIB and SIB1 acquisition. The UE may continue to restart the MIB acquisition stage and reset the counter each time that the number of occasions exceeds the threshold number of occasions. Further, the UE may maintain a second counter of the LBT failures on both the MIB and the SIB1 acquisition, where the second counter may not be reset when the MIB acquisition stage is restarted. The UE may quit the CGI reading procedure based on a determination that the second counter exceeds a second threshold number of occasions, wherein the second threshold number of occasions is greater than the threshold number of occasions of the restart of the MIB acquisition stage. The UE may not provide any error indication back to the network or report CGI reading failure to the network when the UE quits the CGI reading procedure.

In other embodiments of the fourth option, the UE may restart the MIB acquisition stage (such as the MIB acquisition stage 104 (FIG. 1) and/or the MIB acquisition stage 204 (FIG. 2)) based on a determination that the number of occasions in which a PDCCH that schedules a SIB1 is not available, a PDSCH that carries a SIB1 is not available, and/or a MIB is not available during the SIB1 acquisition stage exceeds a threshold number of occasions. The UE may further count a number of times that the MIB acquisition stage has been restarted and compare the number of times that the MIB acquisition stage has been restarted with a threshold number of MIB restarts. The UE may quit the CGI reading procedure based on a determination that the number of times that the MIB acquisition stage has been restarted exceeds the threshold number of MIB restarts. The UE may not provide an error indication to the network or report a CGI reading failure to the network in these instances.

In a fifth option, UE may restart the SIB1 acquisition stage in CGI reading for the same NR-U target cell, but UE may start another counter $K_{SIB1\_TOTAL}$, $(K_{SIB1} \leq K_{SIB1\_MAX} \leq K_{SIB1\_TOTAL})$, $K_{SIB1\_TOTAL}$ may be the counter for all LBT failures on SIB1 acquisition during the CGI reading period. Thus, the $K_{SIB1\_TOTAL}$ counter may track LBT failures for an entirety of the CGI reading period, while the $K_{SIB1}$ counter tracks LBT failures for a specific SIB1 acquisition phase. If $K_{SIB1\_TOTAL}$ reaches a threshold, UE may stop and quit CGI reading procedure, and may quit the CGI reading without any error indication back to network or reports CGI reading failure to network. For example, the UE may restart the SIB1 acquisition stage (such as the SIB1 acquisition stage 106 (FIG. 1) and/or the SIB1 acquisition stage 206 (FIG. 2)) based on a determination that the number of occasions in which a PDCCH that schedules a SIB1 is not available, a PDSCH that carries a SIB1 is not available, and/or a MIB is not available during the SIB1 acquisition stage exceeds a threshold number of occasions. The UE may reset the count for the LBT failures on both MIB and SIB1 acquisition and restart the counting for the LBT failures on both MIB and SIB1 acquisition. The UE may continue to restart the SIB1 acquisition stage and reset the counter each time that the number of occasions exceeds the threshold number of occasions. Further, the UE may maintain a second counter of the LBT failures on both the MIB and the SIB1 acquisition, where the second counter may not be reset when the SIB1 acquisition stage is restarted. The UE may quit the CGI reading procedure based on a determination that the second counter exceeds a second threshold number of occasions, wherein the second threshold number of occasions is greater than the threshold number of occasions of the restart of the SIB1 acquisition stage. The UE may not provide any error indication back to the network or report CGI reading failure to the network when the UE quits the CGI reading procedure.

In other embodiments of the fifth option, the UE may restart the SIB1 acquisition stage (such as the SIB1 acquisition stage 106 (FIG. 1) and/or the SIB1 acquisition stage 206 (FIG. 2)) based on a determination that the number of occasions in which a PDCCH that schedules a SIB1 is not available, a PDSCH that carries a SIB1 is not available, and/or a MIB is not available during the SIB1 acquisition stage exceeds a threshold number of occasions. The UE may further count a number of times that the SIB1 acquisition stage has been restarted and compare the number of times that the SIB1 acquisition stage has been restarted with a threshold number of SIB1 restarts. The UE may quit the CGI reading procedure based on a determination that the number of times that the SIB1 acquisition stage has been restarted exceeds the threshold number of SIB1 restarts. The UE may not provide an error indication to the network or report a CGI reading failure to the network in these instances. $K_{SIB1}$, $K_{SIB1\_MAX}$, $K_{SIB1\_TOTAL}$, $K_{TOTAL}$ may be predefined in the specification or configured from network. In particular, $K_{MIB}$, $K_{MIB\_MAX}$, and/or $K_{MIB\_TOTAL}$ described in relation to the options above may be predefined in the specification or configured from the network.

In a second approach for CGI reading in NR-U, a generic approach for MIB/SIB1 is presented. The procedure period of CGI reading of a target NR-U Cell may be implemented at UE as $T_{identify\_CGI\_NR-U}=(T_{MIB\_NR-U}+T_{SIB1\_NR-U}+K_{CGI}*T_{SMTC})$ ms. For example, a procedure period (such as the procedure period 402 (FIG. 4) for a CGI reading procedure (such as the CGI reading procedure 100 (FIG. 1) and/or the CGI reading procedure 200 (FIG. 2)) of a target cell may be defined by $T_{identify\_CGI\_NR-U}=(T_{MIB\_NR-U}+T_{SIB1\_NR-U}+K_{CGI}*T_{SMTC})$ ms. $T_{MIB\_NR-U}$ may be the time period used for MIB reading of a NR-U cell, and $T_{SIB1\_NR-U}$ may be the time period used for SIB1 reading. $K_{CGI}$ may be the number of SMTC occasions in which PDCCH (CORESET for SIB1) or RMSI (PDSCH that carries SIB1) or SSB for corresponding MIB is not available at the UE during the SIB1 acquisition stage of the target cell. In this instance, the $T_{MIB\_NR-U}$ and $T_{SIB1\_NR-U}$ may define a base period (such as the base period 404 (FIG. 4) for the procedure period and the $K_{CGI}*T_{SMTC}$ may define an extension period (such as the extension period 406 (FIG. 4)) for the procedure period. That means UE may extend its the CGI reading period if the LBT failure at target cell cause any of the following unavailabilities: the SSB occasions that carries MIB of this target cell not available at the UE (LBT failures disable the SSB transmission), the CORESET for the SIB1 (CORESET0) of this target cell not available at the UE (LBT failure disables the CORESET0 transmission); the RMSI (PDSCH that carries SIB1) of this target cell not available at the UE (LBT failure disables the RMSI transmission). Accordingly, the UE may determine the procedure period for the CGI reading procedure based on a number of occasions in which a SSB is not available during a CGI reading procedure, a PDCCH that schedules a SIB1 is not available, a PDSCH that carries a SIB1 is not available, and/or a MIB is not available during a SIB1 acquisition stage (such as the SIB1 acquisition stage 106 (FIG. 1) and/or the SIB1 acquisition stage 206 (FIG. 2)) for SIB1 in these instances.

In some embodiments, the procedure period for the CGI reading procedure may have a maximum time that the procedure period may be extended due to LBT failure. $K_{CGI} \leq K_{CGI\_MAX}$. $K_{CGI\_MAX}$ may be the max number of SMTC periodicity UE can extend due to any of the above unavailabilities for the CGI reading procedure. UE may count the number of SMTC extensions during MIB and SIB1 reading stages (such as the MIB acquisition stage 104 (FIG. 1) and/or the MIB acquisition stage 204 (FIG. 2), and the SIB1 acquisition stage 106 (FIG. 1) and/or the SIB1 acquisition stage 206 (FIG. 2), respectively) of CGI reading to check if the total extension due to LBT failure on MIB and SIB1 reading would exceed the threshold of $K_{CGI\_MAX}$. For example, the UE may determine a number of occasions in which a SSB is not available during a CGI reading procedure, a PDCCH that schedules a SIB1 is not available, a PDSCH that carries a SIB1 is not available, and/or a MIB is not available during a SIB1 acquisition stage for SIB1 exceeds a threshold number of occasions (defined as $K_{CGI\_MAX}$).

Upon exceeding $K_{CGI\_MAX}$ over the period of entire CGI reading, one of three options may be applied. In a first option, UE may restart the MIB acquisition stage in CGI reading for the same NR-U target cell (because MIB reading is the first stage of CGI reading), the CGI reading process may not stop. For example, the UE may restart the MIB acquisition stage (such as the MIB acquisition stage 104 (FIG. 1) and/or the MIB acquisition stage 204 (FIG. 2)) based on a determination that the number of occasions in which a SSB is not available during a CGI reading procedure, a PDCCH that schedules a SIB1 is not available, a PDSCH that carries a SIB1 is not available, and/or a MIB is not available during a SIB1 acquisition stage for SIB1 exceeds the threshold number of occasions. The UE may continue with the CGI reading procedure with the MIB acquisition stage being restarted.

In a second option, UE may directly drop this CGI reading procedure for this target NR-U cell, and may quit the CGI reading without any error indication back to network or report CGI reading failure to network. For example, the UE may stop the CGI reading procedure based on a determination that the number of occasions in which a SSB is not available during a CGI reading procedure, a PDCCH that schedules a SIB1 is not available, a PDSCH that carries a SIB1 is not available, and/or a MIB is not available during a SIB1 acquisition stage for SIB1 exceeds the threshold number of occasions. The UE may not provide an error indication to the network or report a CGI reading failure to the network in these instances.

In a third option, UE may restart the MIB acquisition stage in CGI reading for the same NR-U target cell, but UE may start another counter $K_{CGI\_TOTAL}$, ($K_{CGI} \leq K_{CGI\_MAX} \leq K_{CGI\_TOTAL}$), $K_{CGI\_TOTAL}$ may be the counter for all LBT failures on MIB and SIB1 acquisition during the CGI reading period. Thus, the $K_{CGI\_TOTAL}$ counter may track LBT failures for an entirety of the CGI reading period, while the $K_{CGI}$ counter tracks LBT failures for a specific MIB and SIB1 acquisition phases. If $K_{CGI\_TOTAL}$ reaches a threshold, UE would stop and quit CGI reading procedure, and may quit the CGI reading without any error indication back to network or reports CGI reading failure to network. For example, the UE may restart the MIB acquisition stage based on a determination that the number of occasions in which a SSB is not available during a CGI reading procedure, a PDCCH that schedules a SIB1 is not available, a PDSCH that carries a SIB1 is not available, and/or a MIB is not available during a SIB1 acquisition stage for SIB 1 exceeds a threshold number of occasions. The UE may reset the count for the LBT failures on the MIB (or SSB that carries the MIB) during the MIB acquisition stage of CGI reading and restart the counting of the LBT failure on the MIB (or the SSB that carries the MIB) during the MIB acquisition stage of CGI reading. The UE may continue to restart the MIB acquisition stage and reset the counter each time that the number of occasions exceeds the threshold number of occasions. Further, the UE may maintain a second counter of the LBT failures on the MIB (or SSB that carries the MIB) during the MIB reading stage of the MIB and SIB1 acquisition, where the second counter may not be reset when the MIB acquisition is restarted. The UE may quit the CGI reading procedure based on a determination that the second counter exceeds a second threshold number of occasions, wherein the second threshold number of occasions is greater than the threshold number of occasions of the restart of the MIB acquisition stage. The UE may not provide any error indication back to the network or report CGI reading failure to the network when the UE quits the CGI reading procedure.

In other embodiments of the third option, the UE may restart the MIB acquisition stage based on a determination that the number of occasions in which a SSB is not available during a CGI reading procedure, a PDCCH that schedules a SIB1 is not available, a PDSCH that carries a SIB1 is not available, and/or a MIB is not available during a SIB1 acquisition stage for SIB1 exceeds the threshold number of occasions. The UE may further count a number of times that the MIB acquisition stage has been restarted and compare the number of times that the MIB acquisition stage has been restarted with a threshold number of MIB restarts. The UE may quit the CGI reading procedure based on a determination that the number of times that the MIB acquisition stage has been restarted exceeds the threshold number of MIB restarts. The UE may not provide an error indication to the network or report a CGI reading failure to the network in these instances. $K_{CGI}$, $K_{CGI\_MAX}$, $K_{CGI\_TOTAL}$ may be predefined in the specification or configured from network. In particular, $K_{MIB}$, $K_{MIB\_MAX}$, and/or $K_{MIB\_TOTAL}$ described in relation to the options above may be predefined in the specification or configured from the network.

An approach for CGI reporting in NR-U is described below. In particular, a CGI reporting delay may be defined for a CGI report taking into possible LBT failures. The legacy CGI reporting procedure timeline (TS 38.133) is:

9.11.3 CGI reporting delay

The CGI reporting delay is defined as the time between a command that will trigger a CGI report and the point when the UE starts to transmit the measurement report over the air interface. This requirement assumes that the measurement report is not delayed by other radio resource control (RRC) signalling on the dedicated control channel (DCCH). This measurement reporting delay excludes a delay uncertainty of $2 \times TTI_{DCCH}$ resulting when inserting the measurement report to the transmission time interval (TTI) of the uplink DCCH. This measurement reporting delay excludes any delay caused by lack of uplink (UL) resources for UE to send the measurement report.

The CGI reporting delay shall be less than $T_{identify\_CGI}$ defined in clause 9.11.2 plus RRC procedure delay defined in clause 12 in TS 38.331 [2], and additional 20 ms margin if target cell is on FR2.

The proposed CGI reporting procedure timeline for NR-U target cell may be as below, (NR-U is only on FR1 in Rel-16). The CGI reporting delay may be less than $T_{identify\_CGI\_NR-U}$ defined in approaches 1 or 2 for the CGI reading in NR-U plus RRC procedure delay defined in clause 12 in TS 38.331, and the delay which caused by 'no UL resources being available for UE to send the CGI report on' and 'all delays due to UL LBT failures' until the successful transmission of the report. For example, a CGI reporting delay may be determined based on a number of occasions in which a SSB, a PDCCH, or a PDSCH is not available during a CGI reading procedure (such as the CGI reading procedure 100 (FIG. 1) and/or the CGI reading procedure 200 (FIG. 2)). Further, the CGI reporting delay may be determined based on delay due to UL LBT failures, where the UL LBT failures may be caused by the UE performing an LBT operation for transmitting the CGI report and determining that a communication channel for transmission of the CGI report is not available.

Figure 5:
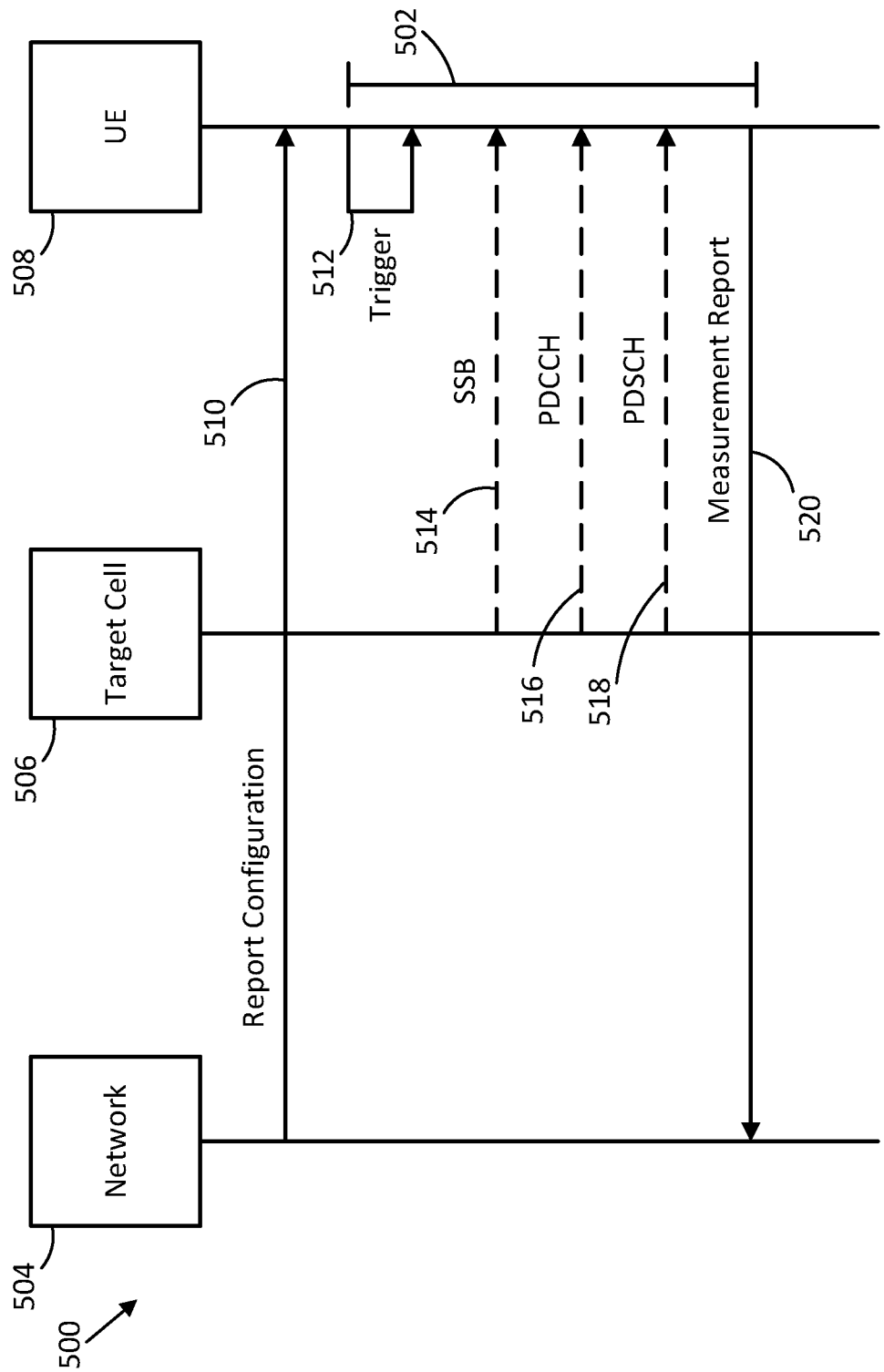
FIG. 5 illustrates an example signaling diagram illustrating a CGI reporting delay in accordance with some embodiments.

FIG. 5 illustrates an example signaling diagram 500 illustrating a CGI reporting delay in accordance with some embodiments. In particular, the signaling diagram 500 illustrates a CGI reporting delay 502 that may be produced by the approaches described herein. The signaling diagram 500 illustrates transmissions exchanged among a network 504, a target cell 506, and a UE 508 in accordance with some embodiments.

The signaling diagram 500 includes a report configuration message 510 transmitted from the network 504 to the UE 508. The report configuration message 510 may define one or more reports to be provided to the network 504 by the UE 508. For example, the report configuration message 510 may define that the UE 508 is to provide a CGI report to the network 504. The report configuration message 510 may further define which cells are to be included in the CGI report, a trigger (such as periodic reporting or reporting based on occurrence of a defined event) for the CGI report, or some combination thereof. The report configuration message 510 may cause the UE 508 to be configured to provide CGI reports to the network.

The signaling diagram 500 includes detection of a trigger 512. In particular, the UE 508 may detect a trigger as defined by the report configuration message 510. The detection of the configure by the UE 508 may cause the UE 508 to initiate a CGI reading procedure (such as the CGI reading procedure 100 (FIG. 1) and/or the CGI reading procedure 200 (FIG. 2)).

During the CGI reading procedure, there may be one or more occasions (such as the occasions described in relation to FIG. 3) for transmissions of SSB, PDCCH, and/or PDSCH, as illustrated by SSB occasions 514, PDCCH occasions 516, and PDSCH occasions 518, respectively. The SSB occasions 514, the PDCCH occasions 516, and the PDSCH occasions may comprise SMTC or SSB occasions. The target cell 506 may determine whether to transmit transmissions within each of the occasions based on LBT procedures. For example, if an LBT procedure of an occasion performed by the target cell 506 indicates a pass, the target cell 506 may transmit the corresponding transmission within the occasion. If an LBT procedure of an occasion performed by the target cell 506 indicates a failure, the target cell 506 may not transmit the corresponding transmission within the occasion.

The UE 508 may receive the transmissions transmitted by the target cell 506 in the SSB occasions 514, the PDCCH occasions 516, and/or the PDSCH occasions 518. The UE 508 may determine a CGI for the target cell 506 based on the transmissions received from the target cell 506. In instances where the target cell 506 fails to transmit a transmission due to LBT failure, the UE may count the number of occasions in which a transmission has not been transmitted. The CGI reporting delay 502 may be determined based on the number of occasions in which a transmission has not been transmitted in some embodiments, in accordance with the approaches described herein. In some embodiments, the target cell 506 may determine the CGI reporting delay 502 based on the number of occasions where the target cell 506 does not transmit the transmissions and/or the UE 508 may determine the CGI reporting delay 502 based on the number of occasions where the UE 508 does not receive the transmissions.

The signaling diagram 500 may further include a measurement report transmission 520. In particular, the UE 508 may transmit a measurement report to the network 504 in the measurement report transmission 520. The measurement report may include results of the CGI reading procedure, which may be a CGI for the target cell 506. The CGI reporting delay 502 may extend from the time of the detection of the trigger 512 to the time of the measurement report transmission 520. For example, the measurement report transmission 520 may be reported to the network 504 at an expiry of the CGI reporting delay 502.

If the waiting time for UE to report the CGI exceeds a threshold $T_{report\_MAX}$, one of three options may be applied. In a first option, UE may restart the CGI reading procedure from MIB reading, and drop the local CGI report. For example, the UE may restart a CGI reading procedure (such as the CGI reading procedure 100 (FIG. 1) and/or the CGI reading procedure 200 (FIG. 2)) based on a determination that a CGI reporting delay (such as the CGI reporting delay 502) exceeds the threshold $T_{report\_MAX}$. In these instances, the UE may not send the CGI report (for example, the UE may not send the measurement report transmission 520).

In a second option, UE may wait until getting the available UL resource for CGI reporting. For example, the UE may wait until a LBT procedure for a resource to transmit the CGI report (such as via the measurement report transmission 520) to the network (such as the network 504) passes to transmit the CGI report. Accordingly, a CGI reporting delay (such as the CGI reporting delay 502) may be extended until the LBT procedure is passed for transmission of the CGI report by the UE to the network.

In a third option, UE may wait until getting the available UL resource for CGI reporting and also may indicate a time-out flag to network together with the CGI reporting. For example, the UE may wait until a LBT procedure for a resource to transmit the CGI report (such as via the measurement report transmission 520) to the network (such as the network 504) passes to transmit the CGI report. Accordingly, a CGI reporting delay (such as the CGI reporting delay 502) may be extended until the LBT procedure is passed for transmission of the CGI report by the UE to the network. In addition, the UE may include a time-out flag in the CGI report to the network. The time-out flag may indicate that the CGI reporting delay exceeded the threshold $T_{report\_MAX}$. The threshold $T_{report\_MAX}$ may be predefined in the specification or configured from network.

Figure 6:
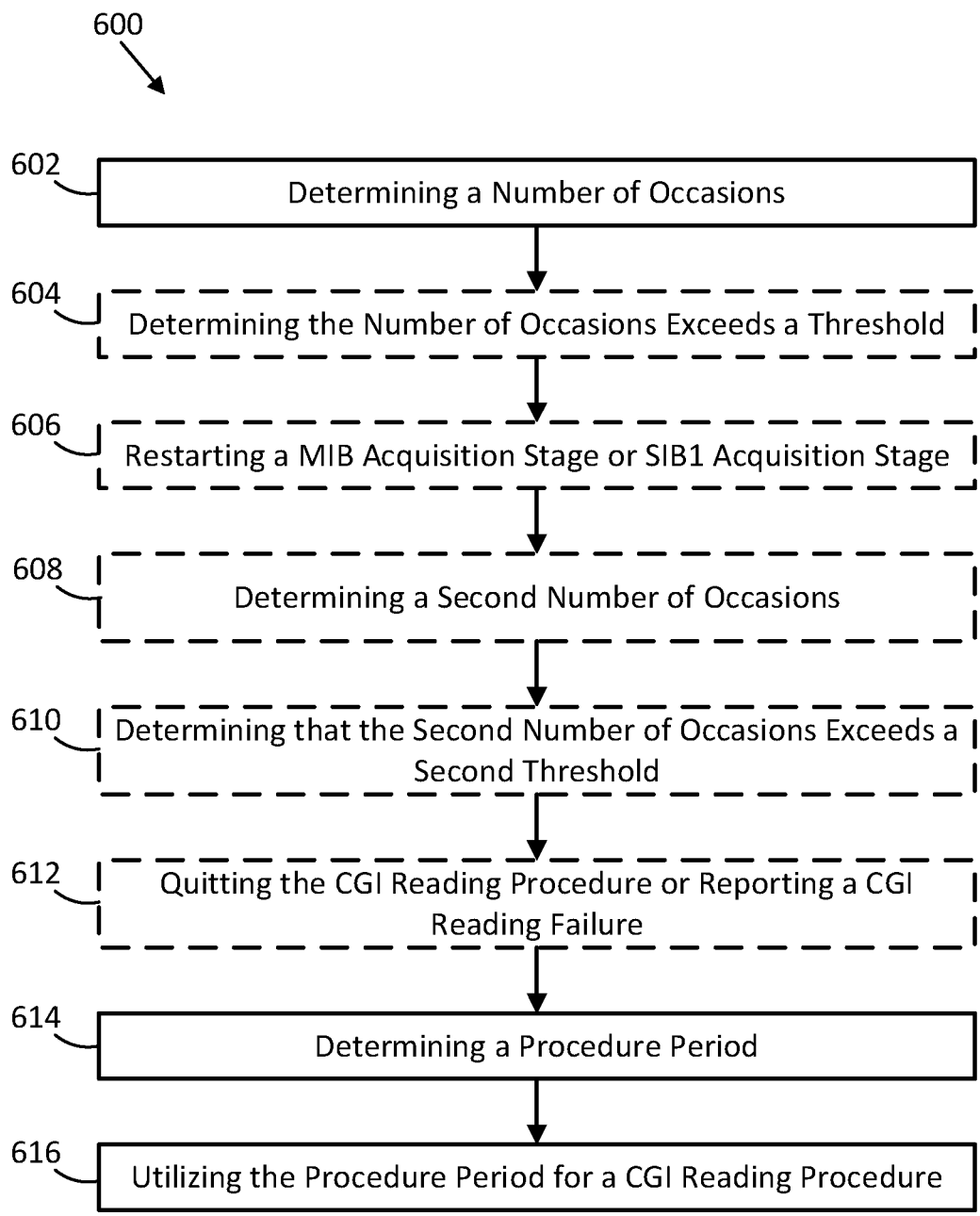
FIG. 6 illustrates an example procedure for determining a procedure period for a CGI reading procedure in accordance with some embodiments.

FIG. 6 illustrates an example procedure 600 for determining a procedure period for a CGI reading procedure in accordance with some embodiments. In particular, the procedure 600 may include determining a procedure period (such as the procedure period 402 (FIG. 4)) for a CGI reading procedure (such as the CGI reading procedure 100 (FIG. 1) and/or the CGI reading procedure 200 (FIG. 2)). The procedure 600 may be performed by a UE (such as the UE 1000 (FIG. 10)).

The procedure 600 may include determining a number of occasions in 602. In particular, a UE may determine a number of occasions scheduled for a transmission from a target cell that were not received (for example, not available at the UE) during a CGI reading procedure. The transmissions which may be scheduled in the occasions may include SSB transmissions, PDCCH transmissions, PDSCH transmissions, or some combination thereof. The determining of the number of occasions may be performed in accordance with any of the approaches for determining the number of occasions in which the transmission are not available at the UE as described throughout this disclosure.

The procedure 600 may further include determining that the number of occasions exceeds a threshold in 604. In particular, the UE may determine that the number of occasions determined in 602 exceeds a threshold. The determining that the number of occasions exceeds the threshold may be performed in accordance with any of the approaches for determining that the number of occasions exceeds a threshold as described throughout this disclosure. In some embodiments, 604 may be omitted.

The procedure 600 may further include restarting an MIB acquisition stage or a SIB1 acquisition stage in 606. In particular, the UE may restart a MIB acquisition stage (such as the MIB acquisition stage 104 (FIG. 1) and/or the MIB acquisition stage 204 (FIG. 2)) or a SIB1 acquisition stage (such as the SIB1 acquisition stage 106 (FIG. 1) and/or the SIB1 acquisition stage 206 (FIG. 2)) based on the determination that the number of occasions exceeds the threshold in 604. The restarting of the MIB acquisition stage or the SIB1 acquisition stage may be performed in accordance with any of the approaches for restarting the MIB acquisition stage or the SIB1 acquisition stage as described throughout this disclosure. Further, a count of the number of occasions may be reset in accordance with the restarting of the MIB acquisition stage or the SIB1 acquisition stage as described throughout this disclosure. In some embodiments, 606 may be omitted.

The procedure 600 may further include determining a second number of occasions in 608. In particular, a UE may determine a second number of occasions scheduled for a transmission from a target cell that were not received (for example, not available at the UE) during the CGI reading procedure. The transmissions which may be scheduled in the occasions may include SSB transmissions, PDCCH transmissions, PDSCH transmissions, or some combination thereof. The determining of the second number of occasions may be performed in accordance with any of the approaches for determining the number of occasions in which the transmission are not available at the UE as described throughout this disclosure. In some embodiments, 608 may be omitted.

The procedure 600 may further include determining that the second number of occasions exceeds a second threshold in 610. The second number of occasions may not be reset w % ben the MIB acquisition stage or the SIB1 acquisition is restarted. Further, the second threshold may be greater than the threshold used for the restarting of the MIB acquisition stage or the SIB1 acquisition stage. The determining that the second number of occasions exceeds the second threshold may be performed in accordance with any of the approaches for determining that the number of occasions exceeds a threshold as described throughout this disclosure. In some embodiments, 610 may be omitted.

The procedure 600 may further include quitting the CGI reading procedure or reporting a CGI reading failure in 612. In particular, the UE may quit a CGI reading procedure or report a CGI reading failure based on the determination that the second number of occasions exceeds the second threshold in 610. The procedure 600 may terminate in response to the quitting of the CGI reading procedure, and 614 and 616 may be omitted in these instances. The quitting of the CGI reading procedure or the reporting of the CGI reading failure may be performed in accordance with any of the approaches for quitting the CGI reading procedure or reporting the CGI reading failure as described throughout this disclosure. In some embodiments, 612 may be omitted.

The procedure 600 may further include determining a procedure period in 614. In particular, the UE may determine a procedure period based on the determined number of occasions in 602. The determining of the procedure period based on the number of occasions may be performed in accordance with any of the approaches for determining the procedure period based on a number of occasions described throughout this disclosure.

The procedure 600 may further include utilizing the procedure period for a CGI reading procedure in 616. In particular, the UE may utilize the procedure period determined in 614 for performing a CGI reading procedure. The utilizing of the procedure period for a CGI reading procedure may be performed in accordance with any of the approaches for utilizing a procedure period for a CGI reading procedure described throughout the disclosure.

Figure 7:
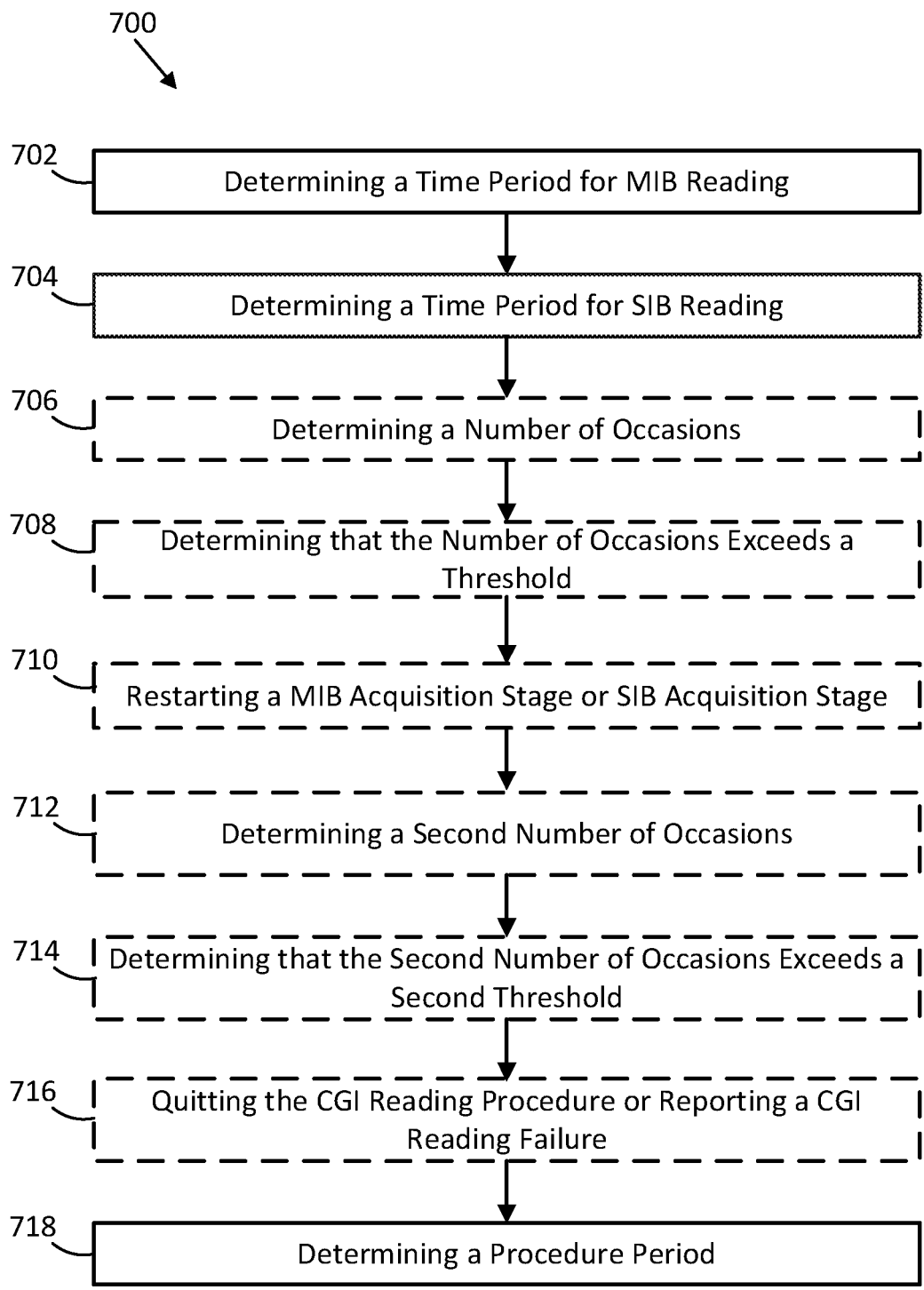
FIG. 7 illustrates an example procedure for determining a procedure period for a CGI reading procedure in accordance with some embodiments.

FIG. 7 illustrates an example procedure 700 for determining a procedure period for a CGI reading procedure in accordance with some embodiments. In particular, the procedure 700 may include determining a procedure period (such as the procedure period 402 (FIG. 4)) for a CGI reading procedure (such as the CGI reading procedure 100 (FIG. 1) and/or the CGI reading procedure 200 (FIG. 2)). The procedure 700 may be performed by a UE (such as the UE 1000 (FIG. 10)).

The procedure 700 may include determining a time period for MIB reading in 702. In particular, the UE may determine a time period for MIB reading based on a number of occasions in which an SSB is not available during a CGI reading procedure. The time period for MIB reading may be determined in accordance with any of the approaches for determining a time period for MIB reading described throughout this disclosure.

The procedure 700 may include determining a time period for SIB reading in 704. In particular, the UE may determine a time period for SIB reading based on a number of occasions in which a PDCCH that schedules an SIB1 is not available, a PDSCH that carries a SIB1 is not available, or a MIB is not available during a SIB1 acquisition stage for SIB1. The time period for SIB reading may be determined in accordance with any of the approaches for determining a time period for SIB reading described throughout this disclosure.

The procedure 700 may include determining a number of occasions in 706. In particular, the UE may determine a number of occasions in which an SSB is not available during a CGI reading procedure, a number of occasions in which a PDCCH that schedules an SIB1 is not available, a PDSCH that carries a SIB1 is not available, or a MIB is not available during a SIB1 acquisition stage for SIB1, or some combination thereof. The number of occasions may be determined in accordance with any of the approaches for determining a number of occasions with transmissions not available at the UE as described throughout this disclosure. In some embodiments, 706 may be omitted.

The procedure 700 may include determining that the number of occasions exceeds a threshold in 708. In particular, the UE may determine that the number of occasions determined in 706 exceeds a threshold. The determining that the number of occasions exceeds the threshold may be performed in accordance with any of the approaches for determining that the number of occasions exceeds a threshold as described throughout this disclosure. In some embodiments, 708 may be omitted.

The procedure 700 may include restarting a MIB acquisition stage or a SIB acquisition stage in 710. In particular, the UE may restart a MIB acquisition stage (such as the MIB acquisition stage 104 (FIG. 1) and/or the MIB acquisition stage 204 (FIG. 2)) or a SIB1 acquisition stage (such as the SIB1 acquisition stage 106 (FIG. 1) and/or the SIB1 acquisition stage 206 (FIG. 2)) based on the determination that the number of occasions exceeds the threshold in 708. The restarting of the MIB acquisition stage or the SIB1 acquisition stage may be performed in accordance with any of the approaches for restarting the MIB acquisition stage or the SIB1 acquisition stage as described throughout this disclosure. Further, a count of the number of occasions may be reset in accordance with the restarting of the MIB acquisition stage or the SIB1 acquisition stage as described throughout this disclosure. In some embodiments. 710 may be omitted.

The procedure 700 may further include determining a second number of occasions in 712. In particular, the UE UE may determine a second number of occasions scheduled for a transmission from a target cell that were not received (for example, not available at the UE) during the CGI reading procedure. The transmissions which may be scheduled in the occasions may include SSB transmissions, PDCCH transmissions, PDSCH transmissions, or some combination thereof. The determining of the second number of occasions may be performed in accordance with any of the approaches for determining the number of occasions in which the transmission are not available at the UE as described throughout this disclosure. In some embodiments, 712 may be omitted.

The procedure 700 may further include determining that the second number of occasions exceeds a second threshold in 714. The second number of occasions may not be reset when the MIB acquisition stage or the SIB1 acquisition is restarted. Further, the second threshold may be greater than the threshold used for the restarting of the MIB acquisition stage or the SIB1 acquisition stage. The determining that the second number of occasions exceeds the second threshold may be performed in accordance with any of the approaches for determining that the number of occasions exceeds a threshold as described throughout this disclosure. In some embodiments, 714 may be omitted.

The procedure 700 may further include quitting the CGI reading procedure or reporting a CGI reading failure in 716. In particular, the UE may quit a CGI reading procedure or report a CGI reading failure based on the determination that the second number of occasions exceeds the second threshold in 714. The procedure 700 may terminate in response to the quitting of the CGI reading procedure, and 716 and 718 may be omitted in these instances. The quitting of the CGI reading procedure or the reporting of the CGI reading failure may be performed in accordance with any of the approaches for quitting the CGI reading procedure or reporting the CGI reading failure as described throughout this disclosure. In some embodiments, 716 may be omitted.

The procedure 700 may further include determining a procedure period in 718. In particular, the UE may determine a procedure period based on the determined time period for MIB reading determined in 702 and the determined time period for SIB reading determined in 704. The procedure period may be determined in accordance with any of the approaches for determining the procedure period described throughout this disclosure.

Figure 8:
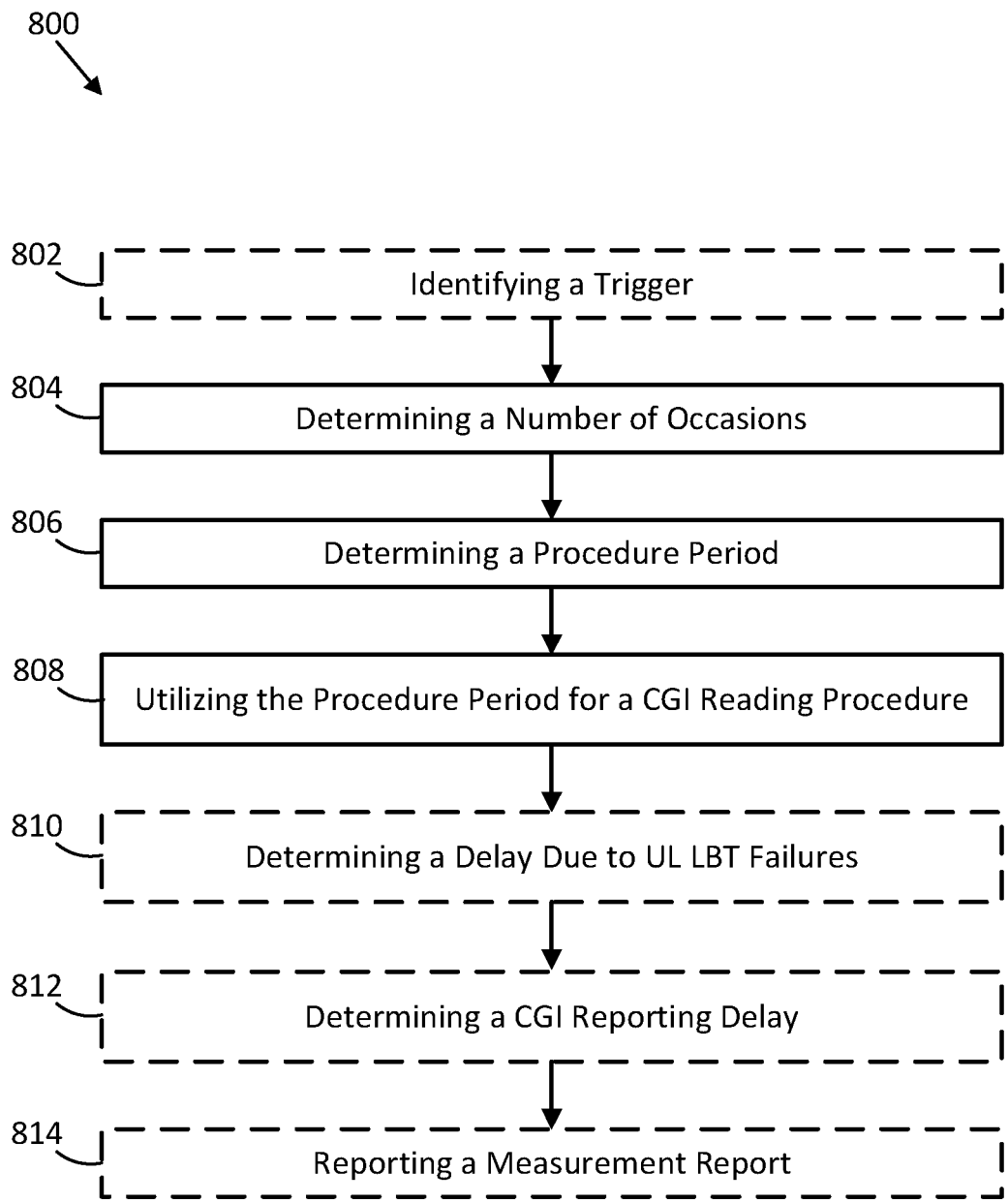
FIG. 8 illustrate an example procedure for performing a CGI reading and reporting procedure in accordance with some embodiments.

FIG. 8 illustrate an example procedure 800 for performing a CGI reading and reporting procedure in accordance with some embodiments. In particular, the procedure 800 may include determining a procedure period (such as the procedure period 402 (FIG. 4)) for a CGI reading procedure (such as the CGI reading procedure 100 (FIG. 1) and/or the CGI reading procedure 200 (FIG. 2)). Further, the procedure 800 may include reporting a measurement report (such as in the measurement report transmission 520 (FIG. 5)). The procedure 800 may be performed by a UE (such as the UE 1000 (FIG. 10)).

The procedure 800 may include identifying a trigger in 802. In particular, the UE may identifying a trigger for a CGI report related to a CGI reading procedure. The trigger may be identified in accordance with any of the approaches for identifying or detecting a trigger described throughout this disclosure. In some embodiments, 802 may be omitted.

The procedure 800 may include determining a number of occasions in 804. In particular, a UE may determine a number of occasions scheduled for a transmission from a target cell that were not received (for example, not available at the UE) during a CGI reading procedure. The transmissions which may be scheduled in the occasions may include SSB transmissions, PDCCH transmissions, PDSCH transmissions, or some combination thereof. The determining of the number of occasions may be performed in accordance with any of the approaches for determining the number of occasions in which the transmission are not available at the UE as described throughout this disclosure.

The procedure 800 may include determining a procedure period in 806. In particular, the UE may determine a procedure period based on the number of occasions determined in 804. The procedure period may be determined in accordance with any of the approaches for determining the procedure period described throughout this disclosure.

The procedure 800 may include utilizing the procedure period for a CGI reading procedure in 808. In particular, the UE may utilize the procedure period determined in 806 for performing a CGI reading procedure. The utilizing of the procedure period for a CGI reading procedure may be performed in accordance with any of the approaches for utilizing a procedure period for a CGI reading procedure described throughout the disclosure.

The procedure 800 may include determining a delay due to UL LBT failures in 810. In particular, the UE may determine a delay due to UL LBT failures on a communication channel to be utilized for reporting a measurement report. The delay due to UL LBT failures may be determined in accordance with any of the approaches for determining delay due to UL LBT failures described throughout this disclosure. In some embodiments. 810 may be omitted.

The procedure 800 may include determining a CGI reporting delay in 812. In particular, the UE may determine the CGI reporting delay based on the occasions determined based on the number of occasions determined in 804 and/or the delay due to UL LBT failures determined in 810. The CGI reporting delay may be determined in accordance with any of the approaches of determining CGI reporting delay described throughout this disclosure.

The procedure 800 may include reporting a measurement report in 814. In particular, the UE may transmit a measurement report to a network, where the measurement report includes a result of the CGI reporting procedure of 808. The measurement report may be reported in accordance with any of the approaches of reporting and/or providing a measurement report described throughout this disclosure.

Figure 9:
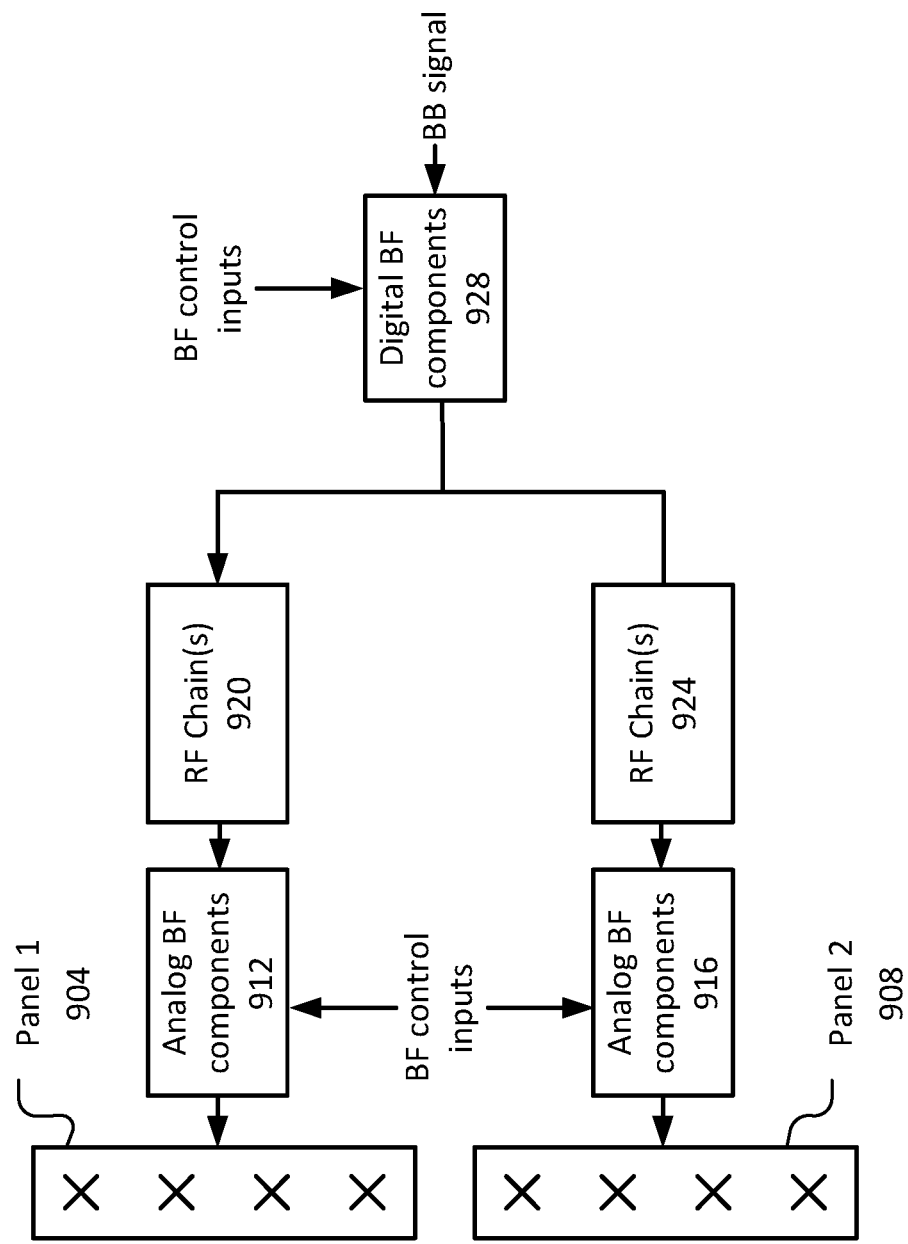
FIG. 9 illustrates example beamforming circuitry in accordance with some embodiments.

FIG. 9 illustrates example beamforming circuitry 900 in accordance with some embodiments. The beamforming circuitry 900 may include a first antenna panel, panel 1 904, and a second antenna panel, panel 2 908. Each antenna panel may include a number of antenna elements. Other embodiments may include other numbers of antenna panels.

Figure 10:
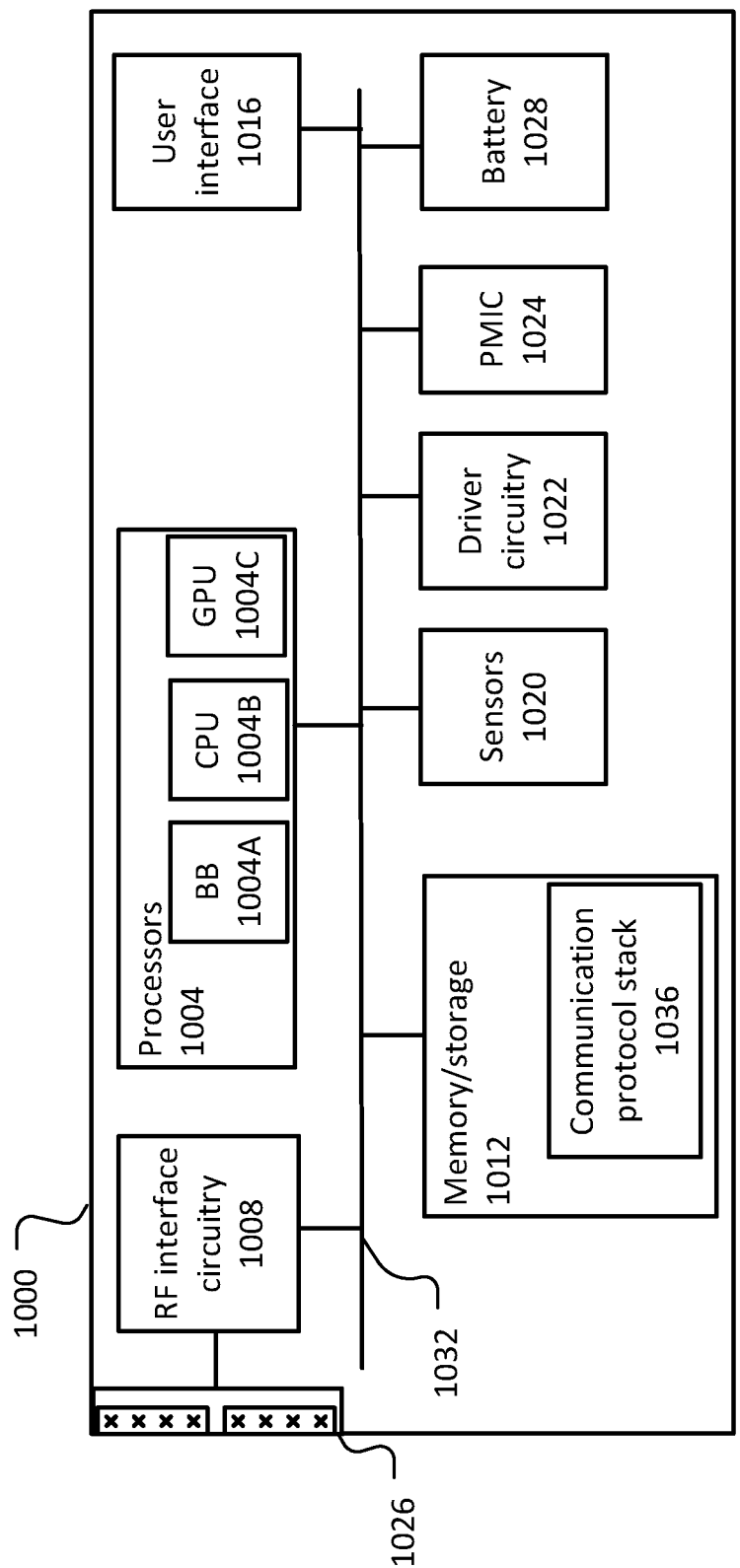
FIG. 10 illustrates an example UE in accordance with some embodiments.

Digital beamforming (BF) components 928 may receive an input baseband (BB) signal from, for example, a baseband processor such as, for example, baseband processor 1004A of FIG. 10. The digital BF components 928 may rely on complex weights to pre-code the BB signal and provide a beamformed BB signal to parallel radio frequency (RF) chains 920/924.

Each RF chain 920/924 may include a digital-to-analog converter to convert the BB signal into the analog domain; a mixer to mix the baseband signal to an RF signal; and a power amplifier to amplify the RF signal for transmission.

The RF signal may be provided to analog BF components 912/916, which may apply additionally beamforming by providing phase shifts in the analog domain. The RF signals may then be provided to antenna panels 904/908 for transmission.

In some embodiments, instead of the hybrid beamforming shown here, the beamforming may be done solely in the digital domain or solely in the analog domain.

In various embodiments, control circuitry, which may reside in a baseband processor, may provide BF weights to the analog/digital BF components to provide a transmit beam at respective antenna panels. These BF weights may be determined by the control circuitry to provide the directional provisioning of the serving cells as described herein. In some embodiments, the BF components and antenna panels may operate together to provide a dynamic phased-array that is capable of directing the beams in the desired direction.

FIG. 10 illustrates an example UE 1000 in accordance with some embodiments. The UE 1000 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.), video surveillance/monitoring devices (for example, cameras, video cameras, etc.), wearable devices (for example, a smart watch), relaxed-IoT devices. In some embodiments, the UE 1000 may be a RedCap UE or NR-Light UE.

The UE 1000 may include processors 1004, RF interface circuitry 1008, memory/storage 1012, user interface 1016, sensors 1020, driver circuitry 1022, power management integrated circuit (PMIC) 1024, antenna structure 1026, and battery 1028. The components of the UE 1000 may be implemented as integrated circuits (ICs), portions thereof, discrete electronic devices, or other modules, logic, hardware, software, firmware, or a combination thereof. The block diagram of FIG. 10 is intended to show a high-level view of some of the components of the UE 1000. However, some of the components shown may be omitted, additional components may be present, and different arrangement of the components shown may occur in other implementations.

The components of the UE 1000 may be coupled with various other components over one or more interconnects 1032, which may represent any type of interface, input/output, bus (local, system, or expansion), transmission line, trace, optical connection. etc. that allows various circuit components (on common or different chips or chipsets) to interact with one another.

The processors 1004 may include processor circuitry such as, for example, baseband processor circuitry (BB) 1004A, central processor unit circuitry (CPU) 1004B, and graphics processor unit circuitry (GPU) 1004C. The processors 1004 may include any type of circuitry or processor circuitry that executes or otherwise operates computer-executable instructions, such as program code, software modules, or functional processes from memory/storage 1012 to cause the UE 1000 to perform operations as described herein.

In some embodiments, the baseband processor circuitry 1004A may access a communication protocol stack 1036 in the memory/storage 1012 to communicate over a 3GPP compatible network. In general, the baseband processor circuitry 1004A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum layer. In some embodiments, the PHY layer operations may additionally/alternatively be performed by the components of the RF interface circuitry 1008.

The baseband processor circuitry 1004A may generate or process baseband signals or waveforms that carry information in 3GPP-compatible networks. In some embodiments, the waveforms for NR may be based cyclic prefix OFDM (CP-OFDM) in the uplink or downlink, and discrete Fourier transform spread OFDM (DFT-S-OFDM) in the uplink.

The memory/storage 1012 may include one or more non-transitory, computer-readable media that includes instructions (for example, communication protocol stack 1036) that may be executed by one or more of the processors 1004 to cause the UE 1000 to perform various operations described herein. The memory/storage 1012 include any type of volatile or non-volatile memory that may be distributed throughout the UE 1000. In some embodiments, some of the memory/storage 1012 may be located on the processors 1004 themselves (for example, L1 and L2 cache), while other memory/storage 1012 is external to the processors 1004 but accessible thereto via a memory interface. The memory/storage 1012 may include any suitable volatile or non-volatile memory such as, but not limited to, dynamic random access memory (DRAM), static random access memory (SRAM), eraseable programmable read only memory (EPROM), electrically eraseable programmable read only memory (EEPROM), Flash memory, solid-state memory, or any other type of memory device technology.

The RF interface circuitry 1008 may include transceiver circuitry and radio frequency front module (RFEM) that allows the UE 1000 to communicate with other devices over a radio access network. The RF interface circuitry 1008 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via antenna structure 1026 and proceed to filter and amplify (with a low-noise amplifier) the signal. The signal may be provided to a receiver of the transceiver that down-converts the RF signal into a baseband signal that is provided to the baseband processor of the processors 1004.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 1026.

In various embodiments, the RF interface circuitry 1008 may be configured to transmit/receive signals in a manner compatible with NR access technologies.

The antenna 1026 may include antenna elements to convert electrical signals into radio waves to travel through the air and to convert received radio waves into electrical signals. The antenna elements may be arranged into one or more antenna panels. The antenna 1026 may have antenna panels that are omnidirectional, directional, or a combination thereof to enable beamforming and multiple input, multiple output communications. The antenna 1026 may include microstrip antennas, printed antennas fabricated on the surface of one or more printed circuit boards, patch antennas, phased array antennas, etc. The antenna 1026 may have one or more panels designed for specific frequency bands including bands in FR1 or FR2.

In some embodiments, the UE 1000 may include the beamforming circuitry 900 (FIG. 9), where the beamforming circuitry 900 may be utilized for communication with the UE 1000. In some embodiments, components of the UE 1000 and the beamforming circuitry may be shared. For example, the antennas 1026 of the UE may include the panel 1 904 and the panel 2 908 of the beamforming circuitry 900.

The user interface circuitry 1016 includes various input/output (I/O) devices designed to enable user interaction with the UE 1000. The user interface 1016 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes "LEDs" and multi-character visual outputs, or more complex outputs such as display devices or touchscreens (for example, liquid crystal displays (LCDs), LED displays, quantum dot displays, projectors, etc.), with the output of characters, graphics, multimedia objects, and the like being generated or produced from the operation of the UE 1000.

The sensors 1020 may include devices, modules, or subsystems whose purpose is to detect events or changes in its environment and send the information (sensor data) about the detected events to some other device, module, subsystem, etc. Examples of such sensors include, inter alia, inertia measurement units comprising accelerometers, gyroscopes, or magnetometers; microelectromechanical systems or nanoelectromechanical systems comprising 3-axis accelerometers. 3-axis gyroscopes, or magnetometers; level sensors; flow sensors; temperature sensors (for example, thermistors); pressure sensors; barometric pressure sensors; gravimeters; altimeters; image capture devices (for example, cameras or lensless apertures): light detection and ranging sensors: proximity sensors (for example, infrared radiation detector and the like); depth sensors; ambient light sensors; ultrasonic transceivers; microphones or other like audio capture devices; etc.

The driver circuitry 1022 may include software and hardware elements that operate to control particular devices that are embedded in the UE 1000, attached to the UE 1000, or otherwise communicatively coupled with the UE 1000. The driver circuitry 1022 may include individual drivers allowing other components to interact with or control various input/output (U/O) devices that may be present within, or connected to, the UE 1000. For example, driver circuitry 1022 may include a display driver to control and allow access to a display device, a touchscreen driver to control and allow access to a touchscreen interface, sensor drivers to obtain sensor readings of sensor circuitry 1020 and control and allow access to sensor circuitry 1020, drivers to obtain actuator positions of electro-mechanic components or control and allow access to the electro-mechanic components, a camera driver to control and allow access to an embedded image capture device, audio drivers to control and allow access to one or more audio devices.

The PMIC 1024 may manage power provided to various components of the UE 1000. In particular, with respect to the processors 1004, the PMIC 1024 may control power-source selection, voltage scaling, battery charging, or DC-to-DC conversion.

In some embodiments, the PMIC 1024 may control, or otherwise be part of, various power saving mechanisms of the UE 1000. For example, if the platform UE is in an RRC_Connected state, where it is still connected to the RAN node as it expects to receive traffic shortly, then it may enter a state known as Discontinuous Reception Mode (DRX) after a period of inactivity. During this state, the UE 1000 may power down for brief intervals of time and thus save power. If there is no data traffic activity for an extended period of time, then the UE 1000 may transition off to an RRC_Idle state, where it disconnects from the network and does not perform operations such as channel quality feedback, handover, etc. The UE 1000 goes into a very low power state and it performs paging where again it periodically wakes up to listen to the network and then powers down again. The UE 1000 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 1028 may power the UE 1000, although in some examples the UE 1000 may be mounted deployed in a fixed location, and may have a power supply coupled to an electrical grid. The battery 1028 may be a lithium ion battery, a metal-air battery, such as a zinc-air battery, an aluminum-air battery, a lithium-air battery, and the like. In some implementations, such as in vehicle-based applications, the battery 1028 may be a typical lead-acid automotive battery.

Figure 11:
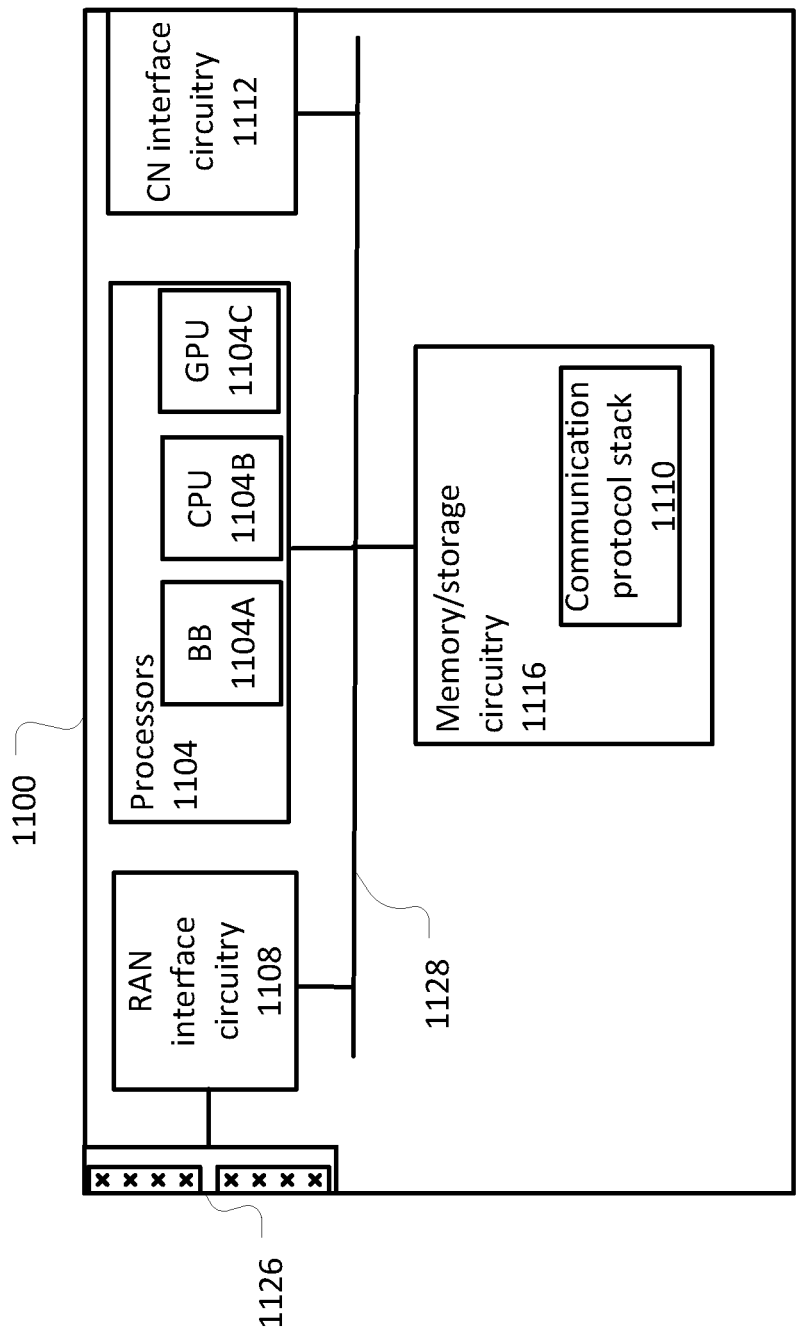
FIG. 11 illustrates an example gNB in accordance with some embodiments.

FIG. 11 illustrates an example gNB 1100 in accordance with some embodiments. The gNB 1100 may include processors 1104, RF interface circuitry 1108, core network (CN) interface circuitry 1112, memory/storage circuitry 1116, and antenna structure 1126.

The components of the gNB 1100 may be coupled with various other components over one or more interconnects 1128.

The processors 1104, RF interface circuitry 1108, memory/storage circuitry 1116 (including communication protocol stack 1110), antenna structure 1126, and interconnects 1128 may be similar to like-named elements shown and described with respect to FIG. 10.

The CN interface circuitry 1112 may provide connectivity to a core network, for example, a 5th Generation Core network (5GC) using a 5GC-compatible network interface protocol such as carrier Ethernet protocols, or some other suitable protocol. Network connectivity may be provided to/from the gNB 1100 via a fiber optic or wireless backhaul. The CN interface circuitry 1112 may include one or more dedicated processors or FPGAs to communicate using one or more of the aforementioned protocols. In some implementations, the CN interface circuitry 1112 may include multiple controllers to provide connectivity to other networks using the same or different protocols.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

In the following sections, further exemplary embodiments are provided.

Example 1 may include one or more computer-readable media having instructions that, when executed by one or more processors, cause a user equipment (UE) to determine a number of occasions in which a synchronization signal/physical broadcast channel block (SSB), a physical downlink control channel (PDCCH), or a physical downlink shared channel (PDSCH) is not available during a cell global identifier (CGI) reading procedure, determine a procedure period for reading a CGI based at least in part on the number of occasions in which the SSB, the PDCCH, or the PDSCH is not available during the CGI reading procedure, and utilize the procedure period to perform the CGI reading procedure.

Example 2 may include the one or more computer-readable media of example 1, wherein to determine the procedure period includes to determine an extension period for the procedure period based at least in part on the number of occasions in which the SSB, the PDCCH, or the PDSCH is not available during the CGI reading procedure and a synchronization signal/physical broadcast channel block-based measurement timing configuration (SMTC) periodicity.

Example 3 may include the one or more computer-readable media of example 1, wherein the number of occasions in which the SSB, the PDCCH, or the PDSCH is not available during the CGI reading procedure comprises a number of occasions in which the SSB is not available during the CGI reading procedure, w % herein the SSB carries a master information block (MIB), and wherein the instructions, when executed by the one or more processors, further cause the UE to determine that the number of occasions in which the SSB is not available during the CGI reading procedure exceeds a threshold number of occasions, and restart a MIB acquisition stage of the CGI reading procedure based at least in part on said determination that the number of occasions in which the SSB is not available during the CGI reading procedure exceeds the threshold number of occasions.

Example 4 may include the one or more computer-readable media of example 3, wherein the number of occasions in which the SSB is not available during the CGI reading procedure is a first number of occasions in which the SSB is not available during the CGI reading procedure, wherein the threshold number of occasions is a first threshold number of occasions, and wherein the instructions, when executed by the one or more processors, further cause the UE to determine a second number of occasions in which the SSB is not available during an entirety of the CGI reading procedure, determine that the second number of occasions in which the SSB is not available during the entirety of the CGI reading procedure exceeds a second threshold number of occasions, the second threshold number of occasions being greater than the first threshold number of occasions, and quit the CGI reading procedure based at least in part on said determination that the second number of occasions in which the SSB is not available during the entirety of the CGI reading procedure exceeds the second threshold number of occasions.

Example 5 may include the one or more computer-readable media of example 1, wherein the number of occasions in which the SSB, the PDCCH, or the PDSCH is not available during the CGI reading procedure comprises a number of occasions in which the SSB is not available during the CGI reading procedure, wherein the SSB carries a master information block (MIB), and wherein the instructions, when executed by the one or more processors, further cause the UE to determine that the number of occasions in which the SSB is not available during the CGI reading procedure exceeds a threshold number of occasions, and quit the CGI reading procedure based at least in part on said determination that the number of occasions in which the SSB is not available during the CGI reading procedure exceeds the threshold number of occasions.

Example 6 may include the one or more computer-readable media of example 1, wherein the number of occasions in which the SSB, the PDCCH, or the PDSCH is not available during the CGI reading procedure comprises a number of occasions in which the SSB is not available during the CGI reading procedure, wherein the SSB carries a master information block (MIB), and wherein the instructions, when executed by the one or more processors, further cause the UE to determine that the number of occasions in which the SSB is not available during the CGI reading procedure exceeds a threshold number of occasions, and report a CGI reading failure to a network based at least in part on said determination that the number of occasions in which the SSB is not available during the CGI reading procedure.

Example 7 may include the one or more computer-readable media of example 1, wherein to determine the number of occasions in which the SSB, the PDCCH, or the PDSCH is not available during the CGI reading procedure includes to determine a number of occasions in which an SSB that carries a master information block (MIB) is not available during the CGI reading procedure, a number of occasions in which a PDCCH transmission that schedules a system information block type 1 (SIB1) transmission is not available during the CGI reading procedure, or a number of occasions in which a PDSCH transmission that carries a SIB1 is not available during the CGI reading procedure.

Example 8 may include the one or more computer-readable media of example 1, wherein the number of occasions in which the SSB, the PDCCH, or the PDSCH is not available during the CGI reading procedure comprises a number of occasions in which the PDCCH or the PDSCH is not available during the CGI reading procedure, wherein the PDCCH or the PDSCH are for system information block type 1 (SIB1), and wherein the instructions, when executed by the one or more processors, further cause the UE to determine that the number of occasions in which the PDCCH or the PDSCH is not available during the CGI reading procedure exceeds a threshold number of occasions, and restart a SIB1 acquisition stage of the CGI reading procedure based at least in part on said determination that the number of occasions in which the PDCCH or the PDSCH is not available at the UE exceeds the threshold number of occasions.

Example 9 may include the one or more computer-readable media of example 8, wherein the number of occasions in which the PDCCH or the PDSCH is not available during the CGI reading procedure is a first number of occasions in which the PDCCH or the PDSCH is not available during the CGI reading procedure, where the threshold number of occasions is a first threshold number of occasions, and wherein, the instructions, when executed by the one or more processors, further cause the UE to determine a second number of occasions in which the PDCCH or the PDSCH is not available during an entirety the CGI reading procedure, determine that the second number of occasions in which the PDCCH or the PDSCH is not available during the entirety of the CGI reading procedure exceeds a second threshold number of occasions, the second threshold number of occasions being greater than the first threshold number of occasions, and quit the CGI reading procedure based at least in part on said determination that the number of occasions in which the PDCCH or the PDSCH is not available during the entirety of the CGI reading procedure exceeds the second threshold number of occasions.

Example 10 may include a user equipment (UE) comprising memory to store a cell global identifier (CGI) for a target cell, and processing circuitry coupled with the memory, the processing circuitry to determine a time period for master information block (MIB) reading based on a number of occasions in which a synchronization signal/physical broadcast channel block (SSB) is not available during a CGI reading procedure, determine a time period for system information block (SIB) reading based on a number of occasions in which a physical downlink control channel (PDCCH) that schedules a system information block type 1 (SIB1) is not available, a physical downlink shared channel (PDSCH) that carries a SIB1 is not available, or a MIB is not available during the CGI reading procedure for SIB1, and determine a procedure period based on the time period for MIB reading and the time period for SIB reading.

Example 11 may include the UE of example 10, wherein the number of occasions in which the PDCCH that schedules the SIB1 is not available, the PDSCH that carries the SIB1 is not available, or the MIB is not available during the CGI reading procedure for SIB1 comprises a number of occasions in which the PDCCH that schedules the SIB1 is not available or the PDSCH that carries the SIB1 is not available during the CGI reading procedure for SIB1, and wherein the processing circuitry is further to determine that the number of occasions in which the PDCCH that schedules the SIB1 is not available or the PDSCH that carries the SIB1 is not available during the CGI reading procedure for SIB1 exceeds a threshold number of occasions, and restart a MIB acquisition stage based at least in part on said determination that the number of occasions in which the PDCCH that schedules the SIB1 is not available or the PDSCH that carries the SIB1 is not available during the CGI reading procedure for SIB1 exceeds the threshold number of occasions.

Example 12 may include the UE of example 11, wherein the number of occasions in which the PDCCH that schedules the SIB1 is not available or the PDSCH that carries the SIB1 is not available during the CGI reading procedure for SIB1 is a first number of occasions in which the PDCCH that schedules the SIB1 is not available or the PDSCH that carries the SIB1 is not available during the CGI reading procedure for SIB1, wherein the threshold number of occasions is a first threshold number of occasions, and wherein the processing circuitry is further to determine a second number of occasions in which the PDCCH that schedules the SIB1 is not available or the PDSCH that carries the SIB1 is not available during an entirety of the CGI reading procedure for SIB1, determine that the second number of occasions in which the PDCCH that schedules the SIB1 is not available or the PDSCH that carries the SIB1 is not available during the entirety of the CGI reading procedure for SIB1 exceeds a second threshold number of occasions, the second threshold number of occasions being greater than the first threshold number of occasions, and quit the CGI reading procedure based at least in part on said determination that the second number of occasions in which the PDCCH that schedules the SIB1 is not available or the PDSCH that carries the SIB1 is not available during the entirety of the CGI reading procedure for SIB1 exceeds the second threshold number of occasions.

Example 13 may include the UE of example 11, wherein the number of occasions in which the PDCCH that schedules the SIB1 is not available or the PDSCH that carries the SIB1 is not available during the CGI reading procedure for SIB1 is a first number of occasions in which the PDCCH that schedules the SIB1 is not available or the PDSCH that carries the SIB1 is not available during the CGI reading procedure for SIB1, wherein the threshold number of occasions is a first threshold number of occasions, and wherein the processing circuitry is further to determine a second number of occasions in which the PDCCH that schedules the SIB1 is not available or the PDSCH that carries the SIB1 is not available during an entirety of the CGI reading procedure for SIB1, determine that the second number of occasions in which the PDCCH that schedules the SIB1 is not available or the PDSCH that carries the SIB1 is not available during the entirety of the CGI reading procedure for SIB1 exceeds a second threshold number of occasions, the second threshold number of occasions being greater than the first threshold number of occasions, and report a CGI reading failure to a network based at least in part on said determination that the second number of occasions in which the PDCCH that schedules the SIB1 is not available or the PDSCH that carries the SIB1 is not available during the entirety of the CGI reading procedure for SIB1 exceeds the second threshold number of occasions.

Example 14 may include the UE of example 10, wherein the processing circuitry is further to determine that a total number of occasions that includes the number of occasions in which the SSB is not available during the CGI reading procedure and the number of occasions in which the PDCCH that schedules the SIB1 is not available, the PDSCH that carries the SIB1 is not available, or the MIB is not available during a CGI reading procedure for SIB1 exceeds a threshold number of occasions, and restart a MIB acquisition stage of the CGI reading procedure based at least in part on said determination that the total number of occasions exceeds the threshold number of occasions.

Example 15 may include the UE of example 14, wherein the total number of occasions is a first total number of occasions, wherein the threshold number of occasions is a first threshold number of occasions, and wherein the processing circuitry is further to determine a second total number of occasions that includes the number of occasions in which the SSB is not available during an entirety of the CGI reading procedure and the number of occasions in which the PDCCH that schedules the SIB1 is not available, the PDSCH that carries the SIB1 is not available, or the MIB is not available during the entirety of the CGI reading procedure for SIB1, determine that the second total number of occasions exceeds a second threshold number of occasions, the second threshold number of occasions being greater than the first threshold number of occasions, and quit the CGI reading procedure based at least in part on said determination that the second total number of occasions exceeds the second threshold number of occasions.

Example 16 may include the UE of example 14, wherein the total number of occasions is a first total number of occasions, wherein the threshold number of occasions is a first threshold number of occasions, and wherein the processing circuitry is further to determine a second total number of occasions that includes the number of occasions in which the SSB is not available during an entirety of the CGI reading procedure and the number of occasions in which the PDCCH that schedules the SIB1 is not available, the PDSCH that carries the SIB1 is not available, or the MIB is not available during the entirety of the CGI reading procedure for SIB1, determine that the second total number of occasions exceeds a second threshold number of occasions, the second threshold number of occasions being greater than the first threshold number of occasions, and report a CGI reading failure to a network based at least in part on said determination that the second total number of occasions exceeds the second threshold number of occasions.

Example 17 may include a method of operating a user equipment (UE) comprising determining a number of occasions in which a synchronization signal/physical broadcast channel block (SSB), a physical downlink control channel (PDCCH), or a physical downlink shared channel (PDSCH) is not during a cell global identifier (CGI) reading procedure, determining a procedure period for reading a CGI based at least in part on the number of occasions in which the SSB, the PDCCH, or the PDSCH is not available during the CGI reading procedure, and utilizing the procedure period to perform the CGI reading procedure.

Example 18 may include the method of example 17, further comprising identifying a trigger for a CGI report related to the CGI reading procedure, determining a CGI reporting delay based at least in part on the number of occasions in which the SSB, the PDCCH, or the PDSCH is not available during the CGI reading procedure, and reporting a measurement report for the CGI report at an expiry of the CGI reporting delay.

Example 19 may include the method of example 18, further comprising determining a delay due to uplink (UL) listen before talk (LBT) failures, wherein the CGI reporting delay is determined based further on the delay due to UL LBT failures.

Example 20 may include the method of example 17, wherein determining the procedure period includes extending the procedure period from a base period of the procedure period by an extension period equal to the number of occasions in which the SSB, the PDCCH, or the PDSCH is not available during the CGI reading procedure multiplied by a periodicity of synchronization signal/physical broadcast channel block-based measurement timing configuration (SMTC) occasions.

Example 21 may include an apparatus comprising means to perform one or more elements of a method described in or related to any of examples 1-20, or any other method or process described herein.

Example 22 may include one or more non-transitory computer-readable media comprising instructions to cause an electronic device, upon execution of the instructions by one or more processors of the electronic device, to perform one or more elements of a method described in or related to any of examples 1-20, or any other method or process described herein.

Example 23 may include an apparatus comprising logic, modules, or circuitry to perform one or more elements of a method described in or related to any of examples 1-20, or any other method or process described herein.

Example 24 may include a method, technique, or process as described in or related to any of examples 1-20, or portions or parts thereof.

Example 25 may include an apparatus comprising: one or more processors and one or more computer-readable media comprising instructions that, when executed by the one or more processors, cause the one or more processors to perform the method, techniques, or process as described in or related to any of examples 1-20, or portions thereof.

Example 26 may include a signal as described in or related to any of examples 1-20, or portions or parts thereof.

Example 27 may include a datagram, information element, packet, frame, segment, PDU, or message as described in or related to any of examples 1-20, or portions or parts thereof, or otherwise described in the present disclosure.

Example 28 may include a signal encoded with data as described in or related to any of examples 1-20, or portions or parts thereof, or otherwise described in the present disclosure.

Example 29 may include a signal encoded with a datagram, IE, packet, frame, segment, PDU, or message as described in or related to any of examples 1-20, or portions or parts thereof, or otherwise described in the present disclosure.

Example 30 may include an electromagnetic signal carrying computer-readable instructions, wherein execution of the computer-readable instructions by one or more processors is to cause the one or more processors to perform the method, techniques, or process as described in or related to any of examples 1-20, or portions thereof.

Example 31 may include a computer program comprising instructions, wherein execution of the program by a processing element is to cause the processing element to carry out the method, techniques, or process as described in or related to any of examples 1-20, or portions thereof.

Example 32 may include a signal in a wireless network as shown and described herein.

Example 33 may include a method of communicating in a wireless network as shown and described herein.

Example 34 may include a system for providing wireless communication as shown and described herein.

Example 35 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. One or more non-transitory computer-readable media having instructions that, when executed, cause processing circuitry to:
   determine a number of occasions in which a synchronization signal/physical broadcast channel block (SSB), a physical downlink control channel (PDCCH), or a physical downlink shared channel (PDSCH) is not available during a cell global identifier (CGI) reading procedure, wherein to determine the number of occasions includes to determine:
     a number of occasions in which an SSB that carries a master information block (MIB) is not available during the CGI reading procedure;
     a number of occasions in which a PDCCH transmission that schedules a system information block type 1 (SIB1) transmission is not available during the CGI reading procedure; or
     a number of occasions in which a PDSCH transmission that carries a SIB1 is not available during the CGI reading procedure;
   determine a procedure period for reading a CGI based at least in part on the number of occasions in which the SSB, the PDCCH, or the PDSCH is not available during the CGI reading procedure; and utilize the procedure period to perform the CGI reading procedure.

2. The one or more non-transitory computer-readable media of claim 1, wherein to determine the procedure period includes to determine an extension period for the procedure period based at least in part on the number of occasions in which the SSB, the PDCCH, or the PDSCH is not available during the CGI reading procedure and a synchronization signal/physical broadcast channel block-based measurement timing configuration (SMTC) periodicity.

3. The one or more non-transitory computer-readable media of claim 1, wherein the number of occasions in which the SSB, the PDCCH, or the PDSCH is not available during the CGI reading procedure comprises a number of occasions in which the SSB is not available during the CGI reading procedure, wherein the SSB carries a master information block (MIB), and wherein the instructions, when executed, further cause the processing circuitry to:

determine that the number of occasions in which the SSB is not available during the CGI reading procedure exceeds a threshold number of occasions; and restart a MIB acquisition stage of the CGI reading procedure based at least in part on said determination that the number of occasions in which the SSB is not available during the CGI reading procedure exceeds the threshold number of occasions.

4. The one or more non-transitory computer-readable media of claim 3, wherein the number of occasions in which the SSB is not available during the CGI reading procedure is a first number of occasions in which the SSB is not available during the CGI reading procedure, wherein the threshold number of occasions is a first threshold number of occasions, and wherein the instructions, when executed, further cause the processing circuitry to:

determine a second number of occasions in which the SSB is not available during an entirety of the CGI reading procedure;

determine that the second number of occasions in which the SSB is not available during the entirety of the CGI reading procedure exceeds a second threshold number of occasions, the second threshold number of occasions being greater than the first threshold number of occasions; and quit the CGI reading procedure based at least in part on said determination that the second number of occasions in which the SSB is not available during the entirety of the CGI reading procedure exceeds the second threshold number of occasions.

5. The one or more non-transitory computer-readable media of claim 1, wherein the number of occasions in which the SSB, the PDCCH, or the PDSCH is not available during the CGI reading procedure comprises a number of occasions in which the SSB is not available during the CGI reading procedure, wherein the SSB carries a master information block (MIB), and wherein the instructions, when executed, further cause the processing circuitry to:

determine that the number of occasions in which the SSB is not available during the CGI reading procedure exceeds a threshold number of occasions; and quit the CGI reading procedure based at least in part on said determination that the number of occasions in which the SSB is not available during the CGI reading procedure exceeds the threshold number of occasions.

6. The one or more non-transitory computer-readable media of claim 1, wherein the number of occasions in which the SSB, the PDCCH, or the PDSCH is not available during the CGI reading procedure comprises a number of occasions in which the SSB is not available during the CGI reading procedure, wherein the SSB carries a master information block (MIB), and wherein the instructions, when executed, further cause the processing circuitry to:

determine that the number of occasions in which the SSB is not available during the CGI reading procedure exceeds a threshold number of occasions; and report a CGI reading failure to a network based at least in part on said determination that the number of occasions in which the SSB is not available during the CGI reading procedure exceeds the threshold number of occasions.

7. The one or more non-transitory computer-readable media of claim 1, wherein the number of occasions in which the SSB, the PDCCH, or the PDSCH is not available during the CGI reading procedure comprises a number of occasions in which the PDCCH or the PDSCH is not available during the CGI reading procedure, wherein the PDCCH or the PDSCH are for system information block type 1 (SIB1), and wherein the instructions, when executed, further cause the processing circuitry to:

determine that the number of occasions in which the PDCCH or the PDSCH is not available during the CGI reading procedure exceeds a threshold number of occasions; and restart a SIB1 acquisition stage of the CGI reading procedure based at least in part on said determination that the number of occasions in which the PDCCH or the PDSCH is not available exceeds the threshold number of occasions.

8. The one or more non-transitory computer-readable media of claim 7, wherein the number of occasions in which the PDCCH or the PDSCH is not available during the CGI reading procedure is a first number of occasions in which the PDCCH or the PDSCH is not available during the CGI reading procedure, where the threshold number of occasions is a first threshold number of occasions, and wherein, the instructions, when executed, further cause the processing circuitry to:

determine a second number of occasions in which the PDCCH or the PDSCH is not available during an entirety of the CGI reading procedure;

determine that the second number of occasions in which the PDCCH or the PDSCH is not available during the entirety of the CGI reading procedure exceeds a second threshold number of occasions, the second threshold number of occasions being greater than the first threshold number of occasions; and quit the CGI reading procedure based at least in part on said determination that the number of occasions in which the PDCCH or the PDSCH is not available during the entirety of the CGI reading procedure exceeds the second threshold number of occasions.

9. An apparatus comprising:
processing circuitry to:

determine a time period for master information block (MIB) reading based on a number of occasions in which a synchronization signal/physical broadcast channel block (SSB) is not available during a cell global identifier (CGI) reading procedure;

determine a time period for system information block (SIB) reading based on a number of occasions in which a physical downlink control channel (PDCCH) that schedules a system information block type 1 (SIB1) is not available, a physical downlink shared channel (PDSCH) that carries a SIB1 is not available, or a MIB is not available during the CGI reading procedure for SIB1; and
determine a procedure period based on the time period for MIB reading and the time period for SIB reading; and
interface circuitry coupled with the processing circuitry, the interface circuitry to communicatively couple the processing circuitry with a component of a device.

10. The apparatus of claim 9, wherein the number of occasions in which the PDCCH that schedules the SIB1 is not available, the PDSCH that carries the SIB1 is not available, or the MIB is not available during the CGI reading procedure for SIB1 comprises a number of occasions in which the PDCCH that schedules the SIB1 is not available or the PDSCH that carries the SIB1 is not available during the CGI reading procedure for SIB1, and wherein the processing circuitry is further to:
determine that the number of occasions in which the PDCCH that schedules the SIB1 is not available or the PDSCH that carries the SIB1 is not available during the CGI reading procedure for SIB1 exceeds a threshold number of occasions; and
restart a MIB acquisition stage based at least in part on said determination that the number of occasions in which the PDCCH that schedules the SIB1 is not available or the PDSCH that carries the SIB1 is not available during the CGI reading procedure for SIB1 exceeds the threshold number of occasions.

11. The apparatus of claim 10, wherein the number of occasions in which the PDCCH that schedules the SIB1 is not available or the PDSCH that carries the SIB1 is not available during the CGI reading procedure for SIB1 is a first number of occasions in which the PDCCH that schedules the SIB1 is not available or the PDSCH that carries the SIB1 is not available during the CGI reading procedure for SIB1, wherein the threshold number of occasions is a first threshold number of occasions, and wherein the processing circuitry is further to:
determine a second number of occasions in which the PDCCH that schedules the SIB1 is not available or the PDSCH that carries the SIB1 is not available during an entirety of the CGI reading procedure for SIB1;
determine that the second number of occasions in which the PDCCH that schedules the SIB1 is not available or the PDSCH that carries the SIB1 is not available during the entirety of the CGI reading procedure for SIB1 exceeds a second threshold number of occasions, the second threshold number of occasions being greater than the first threshold number of occasions; and
quit the CGI reading procedure based at least in part on said determination that the second number of occasions in which the PDCCH that schedules the SIB1 is not available or the PDSCH that carries the SIB1 is not available during the entirety of the CGI reading procedure for SIB1 exceeds the second threshold number of occasions.

12. The apparatus of claim 10, wherein the number of occasions in which the PDCCH that schedules the SIB1 is not available or the PDSCH that carries the SIB1 is not available during the CGI reading procedure for SIB1 is a first number of occasions in which the PDCCH that schedules the SIB1 is not available or the PDSCH that carries the SIB1 is not available during the CGI reading procedure for SIB1, wherein the threshold number of occasions is a first threshold number of occasions, and wherein the processing circuitry is further to:
determine a second number of occasions in which the PDCCH that schedules the SIB1 is not available or the PDSCH that carries the SIB1 is not available during an entirety of the CGI reading procedure for SIB1;
determine that the second number of occasions in which the PDCCH that schedules the SIB1 is not available or the PDSCH that carries the SIB1 is not available during the entirety of the CGI reading procedure for SIB1 exceeds a second threshold number of occasions, the second threshold number of occasions being greater than the first threshold number of occasions; and
report a CGI reading failure to a network based at least in part on said determination that the second number of occasions in which the PDCCH that schedules the SIB1 is not available or the PDSCH that carries the SIB1 is not available during the entirety of the CGI reading procedure for SIB1 exceeds the second threshold number of occasions.

13. The apparatus of claim 9, wherein the processing circuitry is further to:
determine that a total number of occasions that includes the number of occasions in which the SSB is not available during the CGI reading procedure and the number of occasions in which the PDCCH that schedules the SIB1 is not available, the PDSCH that carries the SIB1 is not available, or the MIB is not available during a CGI reading procedure for SIB1 exceeds a threshold number of occasions; and
restart a MIB acquisition stage of the CGI reading procedure based at least in part on said determination that the total number of occasions exceeds the threshold number of occasions.

14. The apparatus of claim 13, wherein the total number of occasions is a first total number of occasions, wherein the threshold number of occasions is a first threshold number of occasions, and wherein the processing circuitry is further to:
determine a second total number of occasions that includes the number of occasions in which the SSB is not available during an entirety of the CGI reading procedure and the number of occasions in which the PDCCH that schedules the SIB1 is not available, the PDSCH that carries the SIB1 is not available, or the MIB is not available during the entirety of the CGI reading procedure for SIB1;
determine that the second total number of occasions exceeds a second threshold number of occasions, the second threshold number of occasions being greater than the first threshold number of occasions; and
quit the CGI reading procedure based at least in part on said determination that the second total number of occasions exceeds the second threshold number of occasions.

15. The apparatus of claim 13, wherein the total number of occasions is a first total number of occasions, wherein the threshold number of occasions is a first threshold number of occasions, and wherein the processing circuitry is further to:
determine a second total number of occasions that includes the number of occasions in which the SSB is not available during an entirety of the CGI reading procedure and the number of occasions in which the PDCCH that schedules the SIB1 is not available, the PDSCH that carries the SIB1 is not available, or the MIB is not available during the entirety of the CGI reading procedure for SIB1;
determine that the second total number of occasions exceeds a second threshold number of occasions, the second threshold number of occasions being greater than the first threshold number of occasions; and report a CGI reading failure to a network based at least in part on said determination that the second total number of occasions exceeds the second threshold number of occasions.

16. A method comprising:

determining a number of occasions in which a synchronization signal/physical broadcast channel block (SSB), a physical downlink control channel (PDCCH), or a physical downlink shared channel (PDSCH) is not during a cell global identifier (CGI) reading procedure;

determining a procedure period for reading a CGI based at least in part on the number of occasions in which the SSB, the PDCCH, or the PDSCH is not available during the CGI reading procedure;

utilizing the procedure period to perform the CGI reading procedure;

identifying a trigger for a CGI report related to the CGI reading procedure;

determining a CGI reporting delay based at least in part on the number of occasions in which the SSB, the PDCCH, or the PDSCH is not available during the CGI reading procedure; and reporting a measurement report for the CGI report at an expiry of the CGI reporting delay.

17. The method of claim 16, further comprising determining a delay due to uplink (UL) listen before talk (LBT) failures, wherein the CGI reporting delay is determined based further on the delay due to UL LBT failures.

18. The method of claim 16, wherein determining the procedure period includes extending the procedure period from a base period of the procedure period by an extension period equal to the number of occasions in which the SSB, the PDCCH, or the PDSCH is not available during the CGI reading procedure multiplied by a periodicity of synchronization signal/physical broadcast channel block-based measurement timing configuration (SMTC) occasions.

\* \* \* \* \*